US009348105B2

(12) United States Patent
Rudenick et al.

(10) Patent No.: US 9,348,105 B2
(45) Date of Patent: May 24, 2016

(54) SPLICE CHIPS FOR OPTICAL FIBER SPLICE CASSETTES

(71) Applicant: ADC Telecommunications, Inc., Berwyn, PA (US)

(72) Inventors: Paula Rudenick, Jordan, MN (US); Scott C. Sievers, Jordan, MN (US); Oscar Fernando Bran de León, Belle Plaine, MN (US); Gustavo Cano, Chic (MX); Raul Mario Saucedo, Chihuahua (MX)

(73) Assignee: CommScope Technologies LLC, Hickory, NC (US)

( * ) Notice: Subject to any disclaimer, the term of this patent is extended or adjusted under 35 U.S.C. 154(b) by 238 days.

(21) Appl. No.: 13/901,112

(22) Filed: May 23, 2013

(65) Prior Publication Data

US 2014/0205254 A1    Jul. 24, 2014

Related U.S. Application Data

(60) Provisional application No. 61/651,905, filed on May 25, 2012, provisional application No. 61/704,055, filed on Sep. 21, 2012.

(51) Int. Cl.
*G02B 6/00* (2006.01)
*G02B 6/44* (2006.01)

(52) U.S. Cl.
CPC .............. *G02B 6/4454* (2013.01); *G02B 6/444* (2013.01); *G02B 6/4452* (2013.01)

(58) Field of Classification Search
CPC .................................... G02B 6/4454
USPC .......................................... 385/135
See application file for complete search history.

(56) References Cited

U.S. PATENT DOCUMENTS

| | | | |
|---|---|---|---|
| 6,157,766 A | 12/2000 | Laniepce et al. | |
| 6,249,635 B1 * | 6/2001 | Daoud | 385/137 |
| 6,249,636 B1 * | 6/2001 | Daoud | 385/137 |
| 7,272,291 B2 * | 9/2007 | Bayazit et al. | 385/135 |
| 7,274,852 B1 | 9/2007 | Smrha et al. | |
| 7,310,471 B2 | 12/2007 | Bayazit et al. | |
| 7,421,182 B2 | 9/2008 | Bayazit et al. | |
| 7,457,504 B2 | 11/2008 | Smrha et al. | |
| 7,463,810 B2 * | 12/2008 | Bayazit et al. | 385/135 |
| 7,620,288 B2 | 11/2009 | Smrha et al. | |
| 7,684,669 B2 * | 3/2010 | Bayazit et al. | 385/135 |
| 7,751,673 B2 | 7/2010 | Anderson et al. | |
| 7,764,858 B2 | 7/2010 | Bayazit et al. | |
| 7,970,249 B2 | 6/2011 | Solheid et al. | |
| 8,009,954 B2 | 8/2011 | Bran de Leon et al. | |

(Continued)

OTHER PUBLICATIONS

International Search Report and Written Opinion for PCT/US2013/042452 mailed Aug. 23, 2013.

*Primary Examiner* — Sung Pak
(74) *Attorney, Agent, or Firm* — Merchant & Gould P.C.

(57) ABSTRACT

A splice chip includes a base, separation members extending upwardly from the base to define a plurality of rows, and latching fingers extending upwardly from the base to further define the rows. At least one of the rows includes at least a first latching finger, a second latching finger, and a third latching finger. The third latching finger is shorter than the first and second latching fingers. The second latching finger is shorter than the first latching finger. The row also may include a fourth latching finger that is the same height as the first latching finger.

19 Claims, 28 Drawing Sheets

(56) References Cited

U.S. PATENT DOCUMENTS

| | | | |
|---|---|---|---|
| 8,254,742 B2* | 8/2012 | Womack | 385/135 |
| 8,311,380 B2 | 11/2012 | Anderson et al. | |
| 8,554,044 B2 | 10/2013 | Bran de Leon et al. | |
| 2002/0159744 A1* | 10/2002 | Daoud | 385/135 |
| 2006/0215980 A1 | 9/2006 | Bayazit et al. | |
| 2009/0067804 A1* | 3/2009 | Knorr et al. | 385/137 |
| 2009/0110360 A1 | 4/2009 | Anderson et al. | |
| 2010/0183274 A1 | 7/2010 | Brunet et al. | |
| 2010/0284661 A1 | 11/2010 | Bran de Leon et al. | |
| 2011/0255837 A1 | 10/2011 | Solheid et al. | |
| 2011/0280535 A1* | 11/2011 | Womack | 385/135 |
| 2011/0317971 A1 | 12/2011 | Zhang et al. | |

* cited by examiner

SPLICE CHIPS FOR OPTICAL FIBER SPLICE CASSETTES

CROSS-REFERENCE TO RELATED APPLICATIONS

The present application claims the benefit of U.S. Provisional Patent Application Ser. No. 61/651,905, filed May 25, 2012 and U.S. Provisional Patent Application Ser. No. 61/704,055, filed Sep. 21, 2012, which applications are hereby incorporated by reference in their entireties.

BACKGROUND

A wide variety of telecommunication applications utilize fiber optic cables, and in turn involve fiber optic cable splicing and fiber optic cable storage. In these applications, a splice tray is often used to store spliced fiber optic cables. The splice trays commonly include a splice chip for holding or retaining the splice elements of the cables. In telecommunications centers, numerous cables are present. It is desired that such equipment can organize the cables and permit access to the cables in an orderly manner.

SUMMARY

Aspects of the disclosure are directed to a splice chip including a base having a first side, an opposite second side, and guide edges along part of a perimeter of the base. The splice chip also includes separation members extending upwardly from the base to define a plurality of rows; and latching fingers extending upwardly from the base to further define the rows. At least one of the rows includes at least a first latching finger, a second latching finger, and a third latching finger. The third latching finger is shorter than the first and second latching fingers. The second latching finger is shorter than the first latching finger.

A method of organizing fusion splices between a plurality of first optical fibers and a plurality of second optical fibers. The method includes seating a first splice in a first row of a splice chip and latching the first splice to the splice chip with at least a first latching finger; seating a second splice in the first row of the splice chip and latching the second splice to the splice chip with at least a second latching finger; and seating a third splice in the first row of the splice chip and latching the third splice to the splice chip with at least a third latching finger. The first splice protects a fusion splice between one of the first optical fibers and one of the second optical fibers. The second splice protects a fusion splice between another of the first optical fibers and another of the second optical fibers. The second latching finger is laterally aligned with the first latching finger. The third splice protects a fusion splice between yet another of the first optical fibers and yet another of the second optical fibers. The third latching finger is laterally aligned with the first and second latching fingers.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

In general, the disclosure is directed to example splice cassettes including a splice chip held by a cover that couples to a base. The base includes an outer storage channel in which jacketed/buffered cables are stored. The base also includes an inner storage space in which bare/buffered optical fibers are stored. The cover cooperates with the base to enclose the inner storage space when the cover is mounted to the base. The splice chip is configured to hold multiple rows of splices. In certain implementations, the splice chip is configured to hold a stack of splices in each row.

Figure 1:
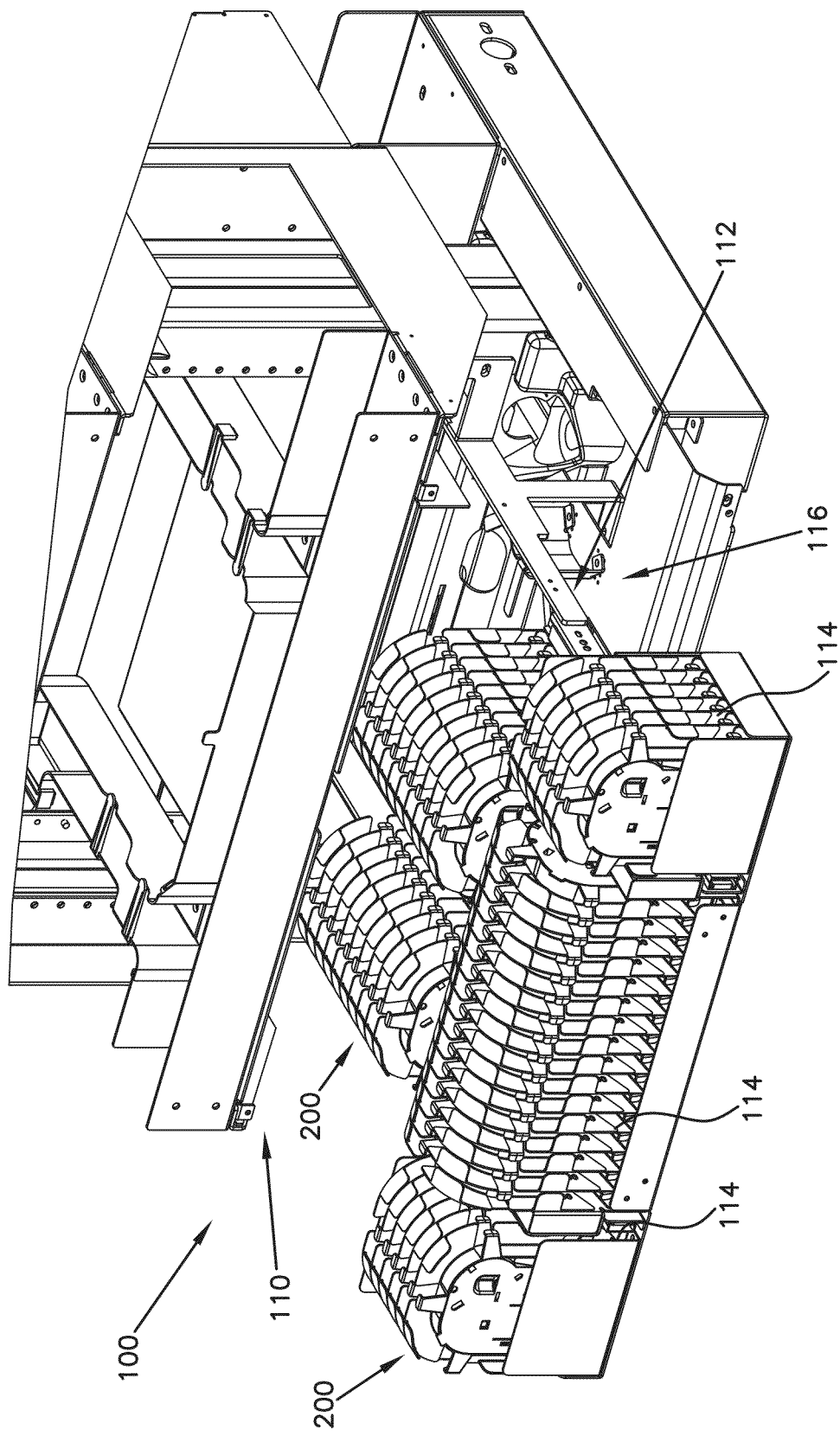
FIG. 1 is a perspective view of a bottom portion of a rack including a sliding frame configured to hold telecommunications equipment such as splice cassettes.

FIG. 1 is a perspective view of a bottom portion of a rack 100 configured to hold telecommunications equipment. The rack 100 includes a splice region 110 at which one or more splice cassettes may be stored on the rack 100. In some implementations, the splice region 110 is disposed beneath a termination region of the rack 100. In certain implementations, the splice region 110 is disposed towards a bottom of the rack 100. In certain implementations, the splice region 110 is disposed at a "dead zone" beneath all termination regions of the rack 100. In certain implementations, the splice region 110 is located at a rear side of the rack 100. In certain implementations, one or more covers can extend over the splice region 110 to inhibit access to and/or to protect the splice region 110. In certain implementations, the one or more covers can be fastened in place to protect components at the splice region 110.

In the example shown, a sliding drawer, blade, or other frame 112 is mounted to the rack 100 at the splice region 110. The sliding frame 112 includes one or more compartments or zones 114 at which splice cassettes 200 may be disposed. The frame 112 may be slid relative to the rack 100 from a stowed position to an extended position to provide access to the splice cassettes 200 disposed in the zones 114. For example, the frame 112 may include guides along which the frame 112 slides. In certain implementations, the splice cassettes 200 are more accessible from a rear of the rack 100 when the frame 112 is slid to the extended position and are less accessible from the rear of the rack 100 when the frame 112 is slid to the stowed position. In certain implementations, the frame 100 inhibits access to the splice cassettes 200 when the frame 112 is in the stowed position within the rack 100.

Figure 30:
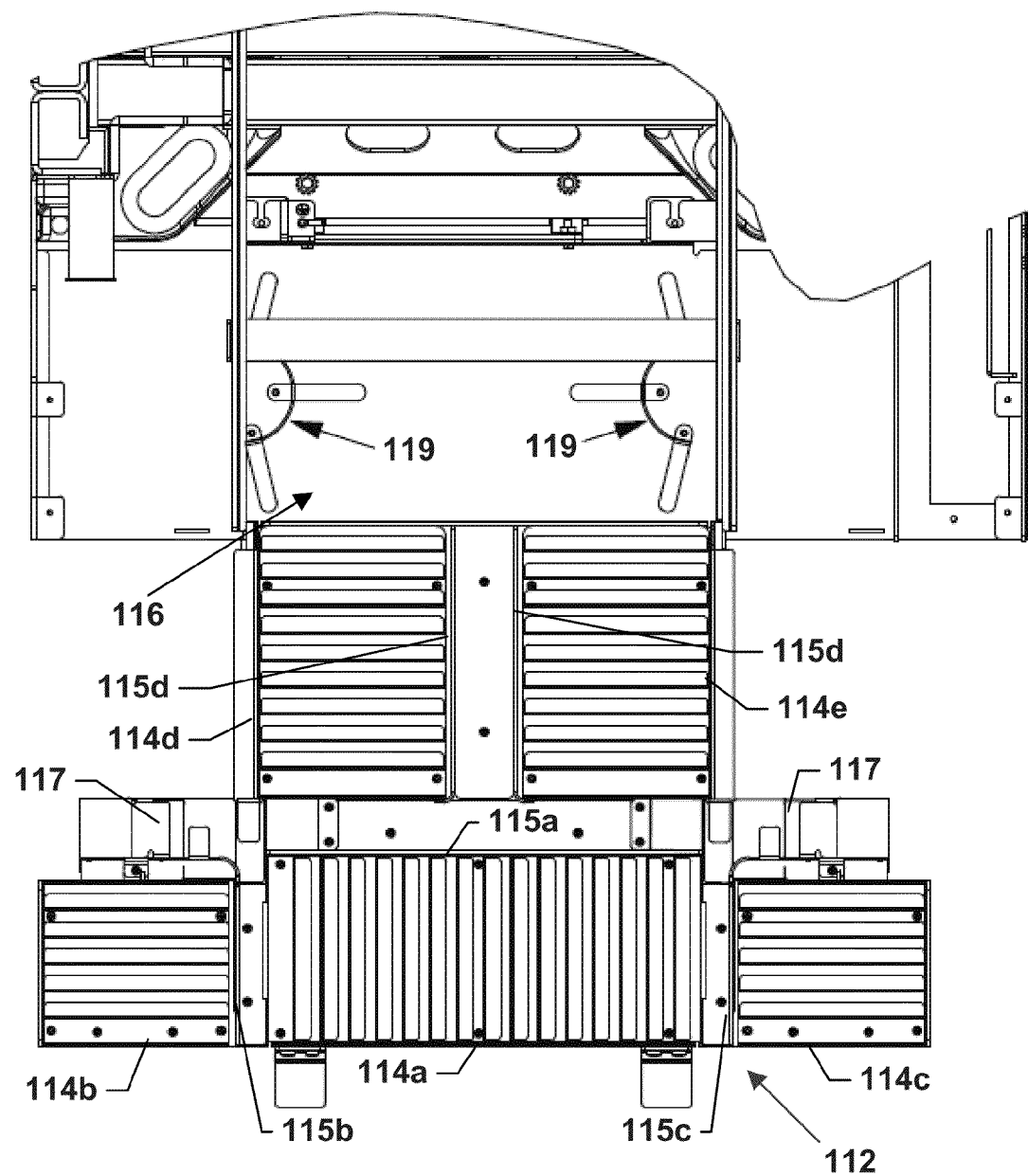
FIG. 30 is a top plan view of the rack of FIG. 1 taken along a lateral cross-section so that the splice area is visible with the frame slid out to show the storage region.

In some implementations, the zones 114 are arranged in a T-shaped configuration on the frame 112 (see FIG. 30). In the example shown, the zones 114 include a first zone 114a that extends horizontally across the rack 100. The first zone 114a is configured to hold one or more splice cassettes 200 in a row extending parallel to a sideways axis of the rack 100. Forward-rearward facing zones 114b, 114c are disposed at opposite ends of the first zone 114a. Each forward-rearward facing zone 114b, 114c is configured to hold one or more splice cassettes 200 in a row extending parallel to a forward-rearward axis of the rack 100. These three zones 114a-114c form the cross-member of the "T" of the frame 112. Behind the first zone 114a (i.e., closer to the front of the rack 100), additional forward-rearward facing zones 114d, 114e can be disposed. These zones 114d, 114e form the base of the "T" of the frame 112. In other implementations, however, the sliding frame 112 may include a greater or lesser number of zones 114 arranged in various other configurations.

In general, the splice cassettes 200 are configured to stack or otherwise fit together so that a bottom major surface of one splice cassette 200 engages a top major surface of another splice cassette 200. In the example shown in FIG. 1, an end 208 (FIG. 2) of each splice cassette 200 seats on the frame 112. The frame 112 may include flat panels or flanges that extend upwardly at opposite ends of one or more of the stacks to retain the splice cassettes 200 within the frame 112. In other implementations, the splice cassettes 200 may be stacked so that a major side or elongated edge of one or more of the splice cassettes seats on the frame 112.

Figure 29:
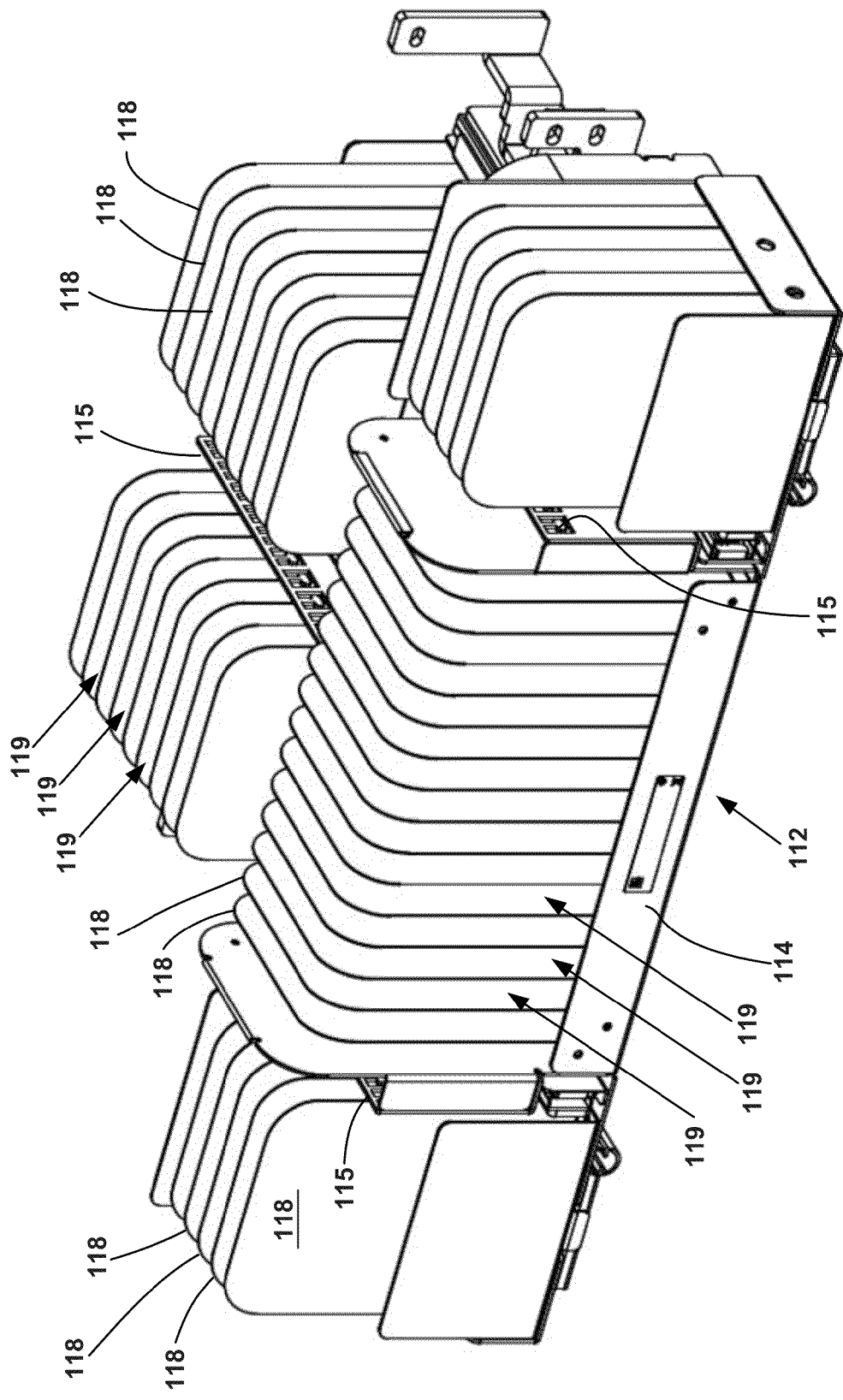
FIG. 29 is an isolated view of a sliding frame of FIG. 1 with the splice cassettes removed for ease in viewing.

FIG. 29 shows one example implementation of the sliding frame 112 in isolation from the frame 100 and with the splice cassettes 200 removed. The sliding frame 112 is configured for high-density applications. In some implementations, the frame 112 can accommodate up to forty-eight splice cassettes, each with a capacity of up to six mass fusion splices, which each splice twelve fiber ribbons (i.e., seventy-two spliced fibers), for a total capacity of 3,456 splices per frame 112. In other implementations, the frame 112 can accommodate a greater or lesser number of splice cassettes 200. In other implementations, the splice cassettes 200 can accommodate a greater or lesser number of splices.

In some implementations, each zone 114 includes spaced apart flanges 118 that define cassette slots 119 therebetween. In some implementations, each cassette slot 119 defines a space sized to receive a single splice cassette 200. In other implementations, each cassette slot 119 defines a space sized to receive multiple splice cassettes 200. In certain implementations, each cassette slot 119 is aligned with at least one lancing section 115. In other implementations, at least one of the lancing sections 115 is accessible from each cassette slot 119. The flanges 118 and slots 119 are sized and shaped to receive the cassettes 200 so that the cassettes 200 stand along narrow edges of the cassettes 200.

The frame 112 includes one or more lancing sections 115 (e.g., at a tie-off points) at which optical fibers or cables can be secured when routed to the splice cassettes 200. The fibers or cables can be anchored to the lancing sections 115 by waxed lacing or other cable securement fasteners. In certain implementations, the incoming cables are secured to the lancing sections 115 as the incoming cables enter the cassettes 200. In the example shown in FIG. 30, a first lancing section 115a extends along the first zone 114 out of view in FIG. 29. A second lancing section 115b is disposed at a first end of the first compartment 114a adjacent the second zone 114b, and a third lancing section 115c is disposed at a second end of the first compartment 114a adjacent the third zone 114c. Fourth and fifth lancing sections 115d, 115e are disposed between the additional forward-rearward facing zones 114d, 114e.

Figure 31:
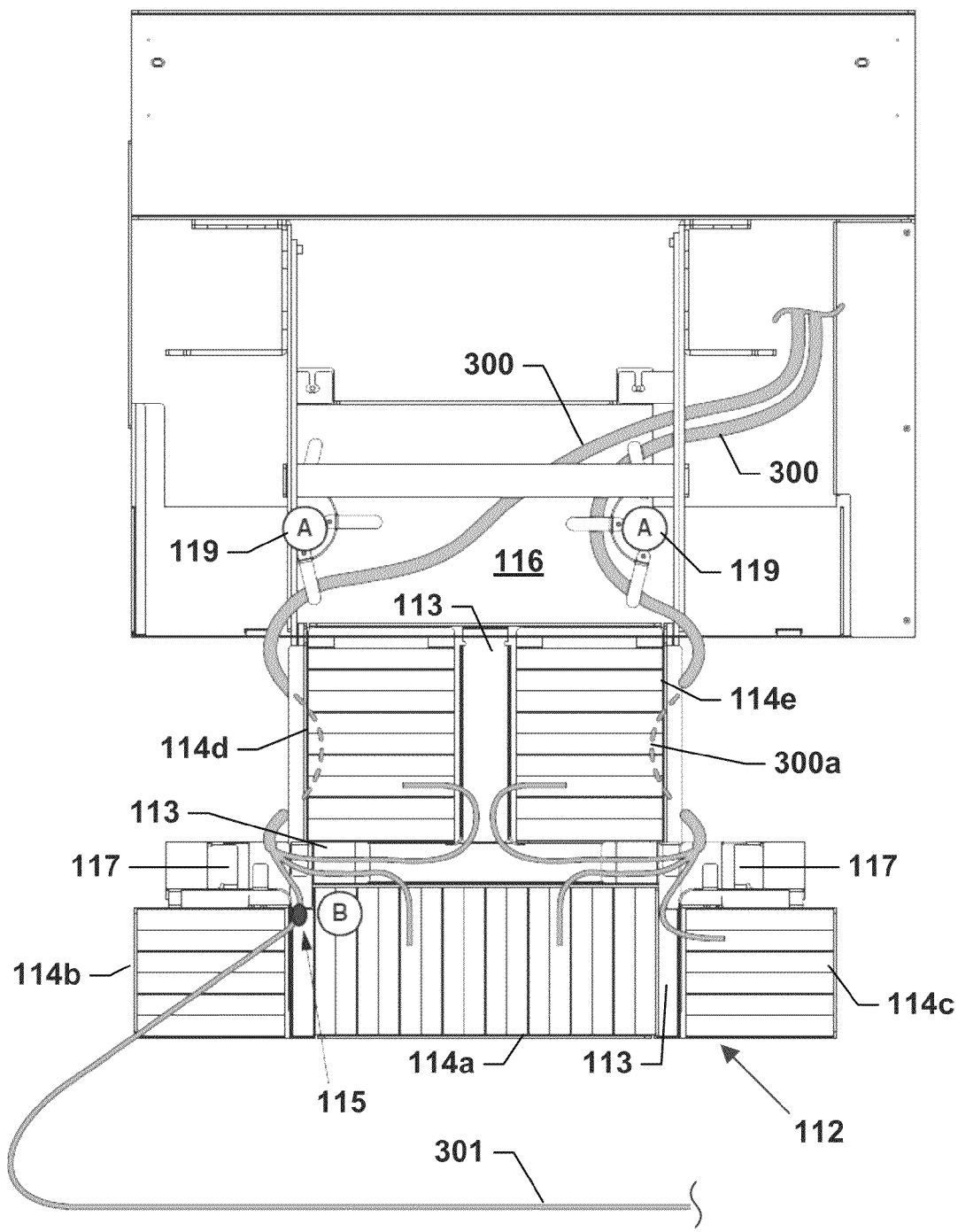
FIG. 31 is a schematic diagram showing example cables routed through the storage area and sliding frame of FIG. 30.

In some implementations, the rack 100 defines a storage area 116 beneath the splice region 110 (e.g., see FIGS. 1, 30, and 31). In certain implementations, the storage region 116 is disposed at a floor on which the rack 100 seats. In certain implementations, the storage region 116 has a width that generally matches a lateral distance across the fourth and fifth zones 114d, 114e of the frame 112. In certain implementations, the storage region 116 has a width that generally matches a distance across the first zone 114a of the frame 112. In the example shown in FIG. 30, the first zone 114a and at least part of the fourth and fifth zones 114d, 114e are disposed over the storage area 116 when the frame 112 is in the stowed position.

The storage region 116 is configured to hold cable slack for the cables and fibers (e.g., network cables, distribution cables, etc.) entering and exiting the splices held at the splice region 110. FIG. 30 shows a top plan view of the storage region 116. One or more bend radius limiters 119 are disposed within the storage area 116. In the example shown, one bend radius limiter 119 is disposed at a first side of the storage area 116 and another bend radius limiter 119 is disposed at an opposite second side of the storage area 116. The bend radius limiters 119 are accessible from the rear of the rack 100 when the frame 112 is disposed at the extended position. The frame 112 blocks access to the limiters 119 from the rear of the rack 100 when the frame 112 is disposed at the stowed position.

As shown in FIG. 31, cables 300 that are to enter and exit the splice cassettes 200 are routed from a bottom of the frame 100 into the storage area 116 below the splice region 110. In the example shown, the cables 300 are routed from one side of the frame. The cables 300 are routed between the two bend radius limiters 119 (see points A in FIG. 31) and up to the sliding frame 112. In some implementations, the cables 300 are disposed within the storage area 116 when the frame 112 is in the stowed position. In particular, the slack length of the cables 300 extends into the storage area 116, extends between and loops around the bend radius limiters 119, and extends up to the frame 112. In some implementations, sliding the frame 112 to the extended position provides access to the storage area 116 from the rear of the rack 100. As the frame 112 is slid to the extended position, the cable slack lengthens out (e.g., unfolds from around the bend radius limiters 119).

In some implementations, the cables 300 can be routed onto the frame 112 through guides (e.g., vertically extending bend radius limiters) 117 and into channels 113 defined between the zones 114. In certain implementations, the guides 117 are disposed where the base of the "T" of the frame 112 and the cross-member of the "T" of the frame 112 meet. In certain implementations, the guides 117 are located generally above the bend radius limiters 119 when the frame 112 is in the stowed position. In some implementations, the cables 300 are branched into fibers or groups of fibers when the cables 300 enter from the guides 117. The separated fibers or groups of fibers (e.g., ribbons, buffered fibers, upjacketed fibers, etc.) are each routed through the channels 113 to one of the zones 114a-114e. The cables 300 are tied off at the lancing points 115 (e.g., see point B in FIG. 31) that correspond to the desired zone 114 of the frame 112.

In the example shown in FIG. 31, a first cable 300 is routed from the right side of the frame 100, through the bend radius limiters 119, to the left side of the storage area 116, beneath the frame 112, and to a top of the frame 112 at a left guide 117. Fibers or groups of fibers branching from the first cable 300 are routed to the second zone 114b, fourth zone 114d, or left side of the first zone 114a and secured to the corresponding lancing sections 115b, 115d, 115a. A second cable 300 is routed from the right side of the frame 100, through the bend radius limiters 119, to the right side of the storage area 116, beneath the frame 112, and to a top of the frame 112 at a right guide 117. Fibers or groups of fibers branching from the second cable 300 are routed to the third zone 114c, fifth zone 114e, or right side of the first zone 114a and secured to the corresponding lancing sections 115c, 115e, 115a. In some implementations, the cables 300 are routed straight from the storage area 116 to the guides 117. In other implementations, the cables 300 are curved or undulated en route to the respective guide 117 (e.g., see section 300a in FIG. 31).

In some implementations, end lengths of the cables 300 can be removed from the rack 100 and prepared for splicing within one or more splice cassettes 200 at a location remote from the rack 100. For example, the terminated end of a cable 300 can be broken out, ribbonized (if initially stranded), and spliced to one or more other cables at a working location that is between 1 foot and fifty feet away from the rack 100. In certain implementations, the working location is located within thirty feet of the rack 100. In certain implementations, the working location is located within twenty feet of the rack 100. In certain implementations, the working location is located within ten feet of the rack 100. At least some of the excess slack of the end length of the cable 300 is taken up by winding the end length around the splice cassettes 200, as will be disclosed in more detail below, until the splice cassette 200 is located at the frame 112.

Figure 2:
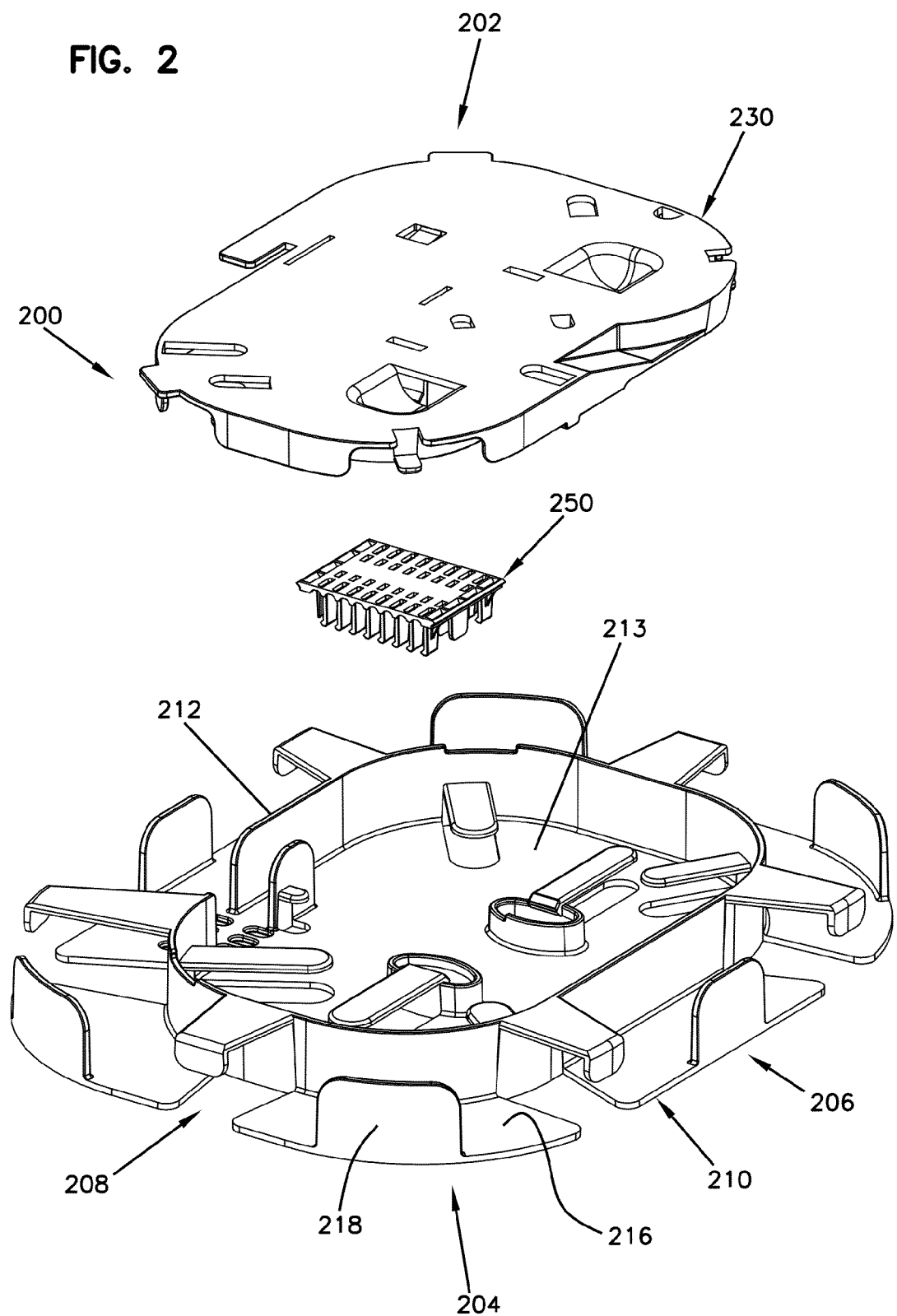
FIG. 2 is a perspective view of an example splice cassette including a cover and a chip exploded from a base.
Figure 3:
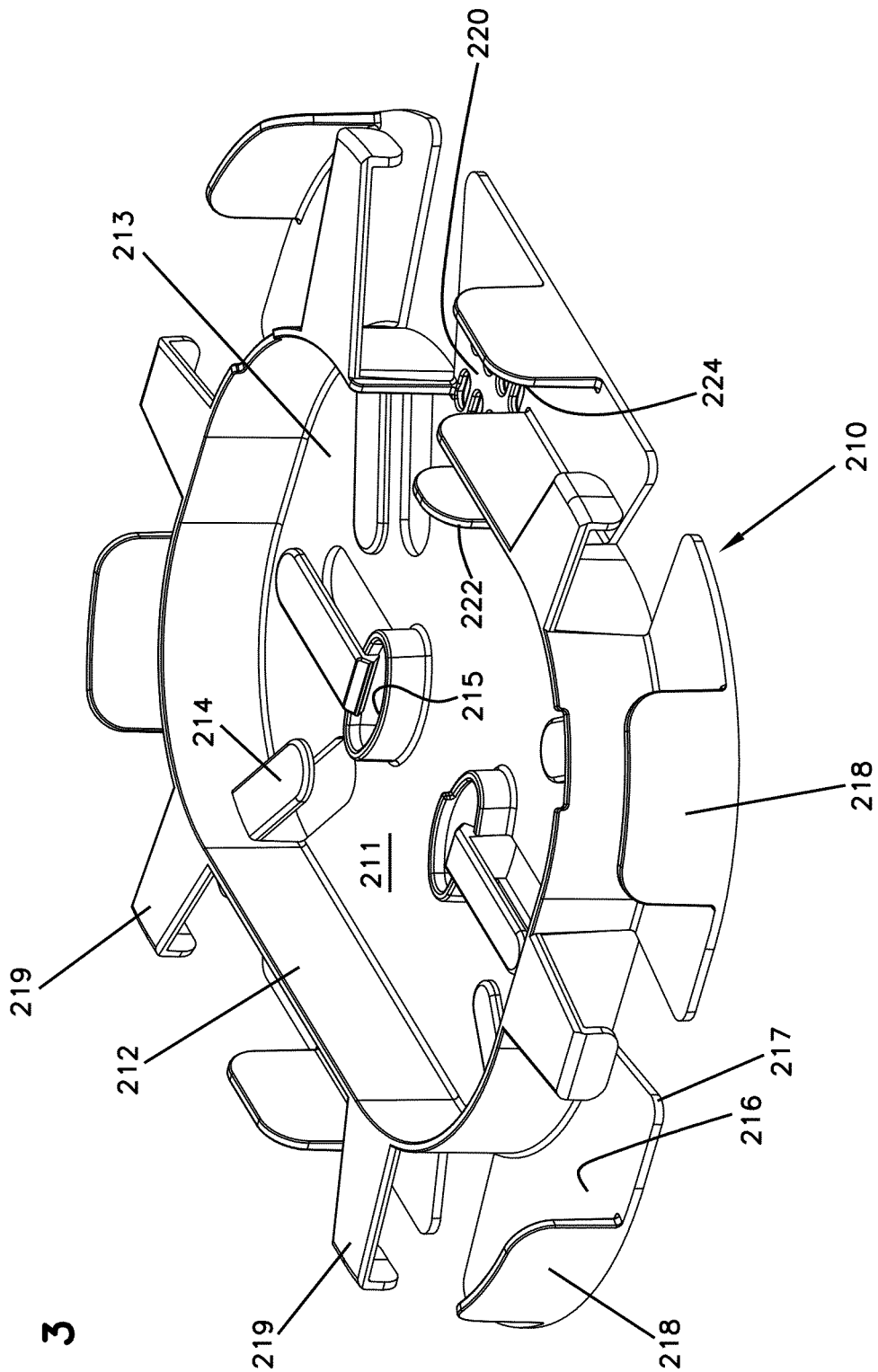
FIG. 3 is a top perspective view of an example base suitable for use with the splice cassette of FIG. 2.
Figure 4:
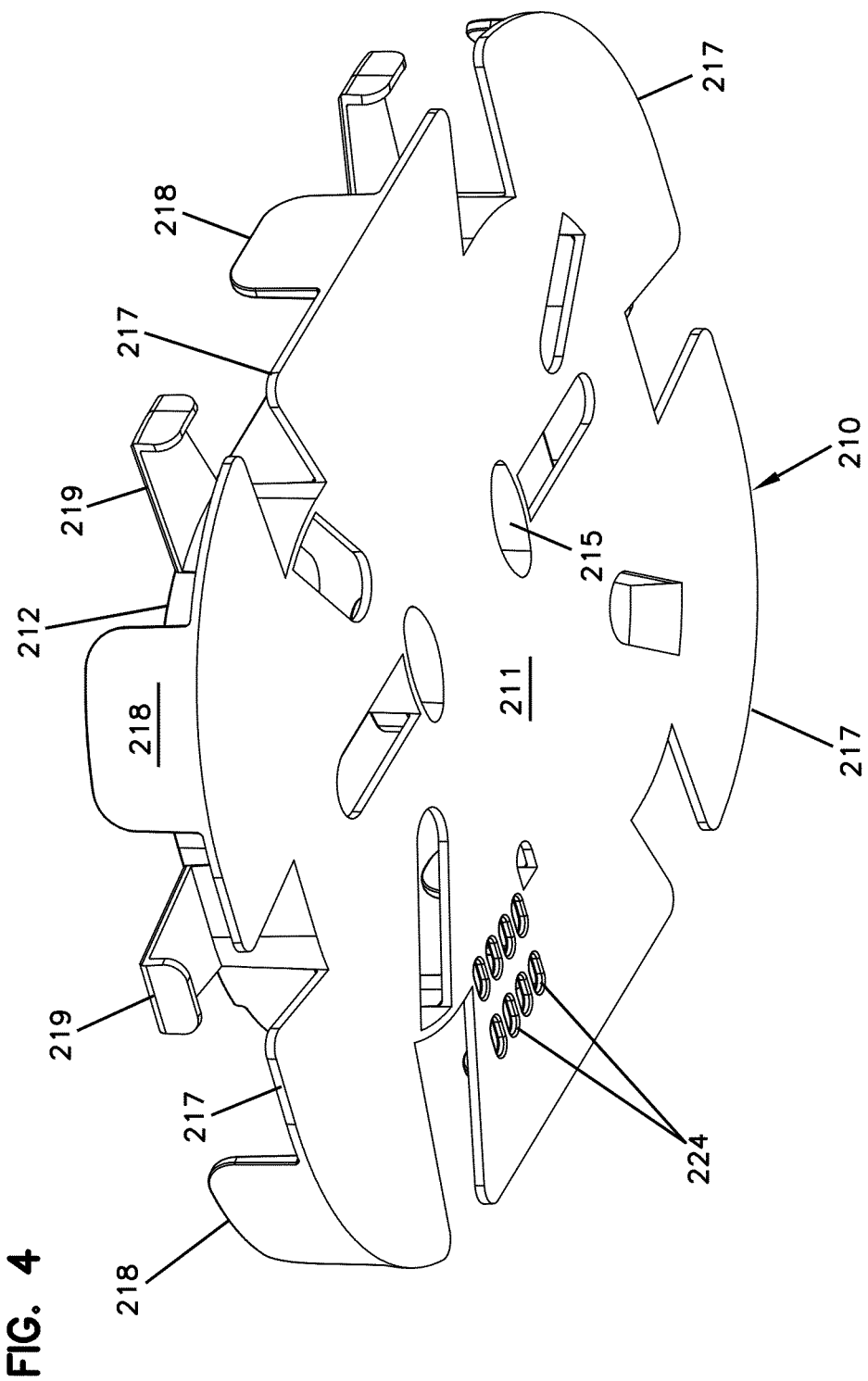
FIG. 4 is a bottom perspective view of the base of FIG. 3.
Figure 5:
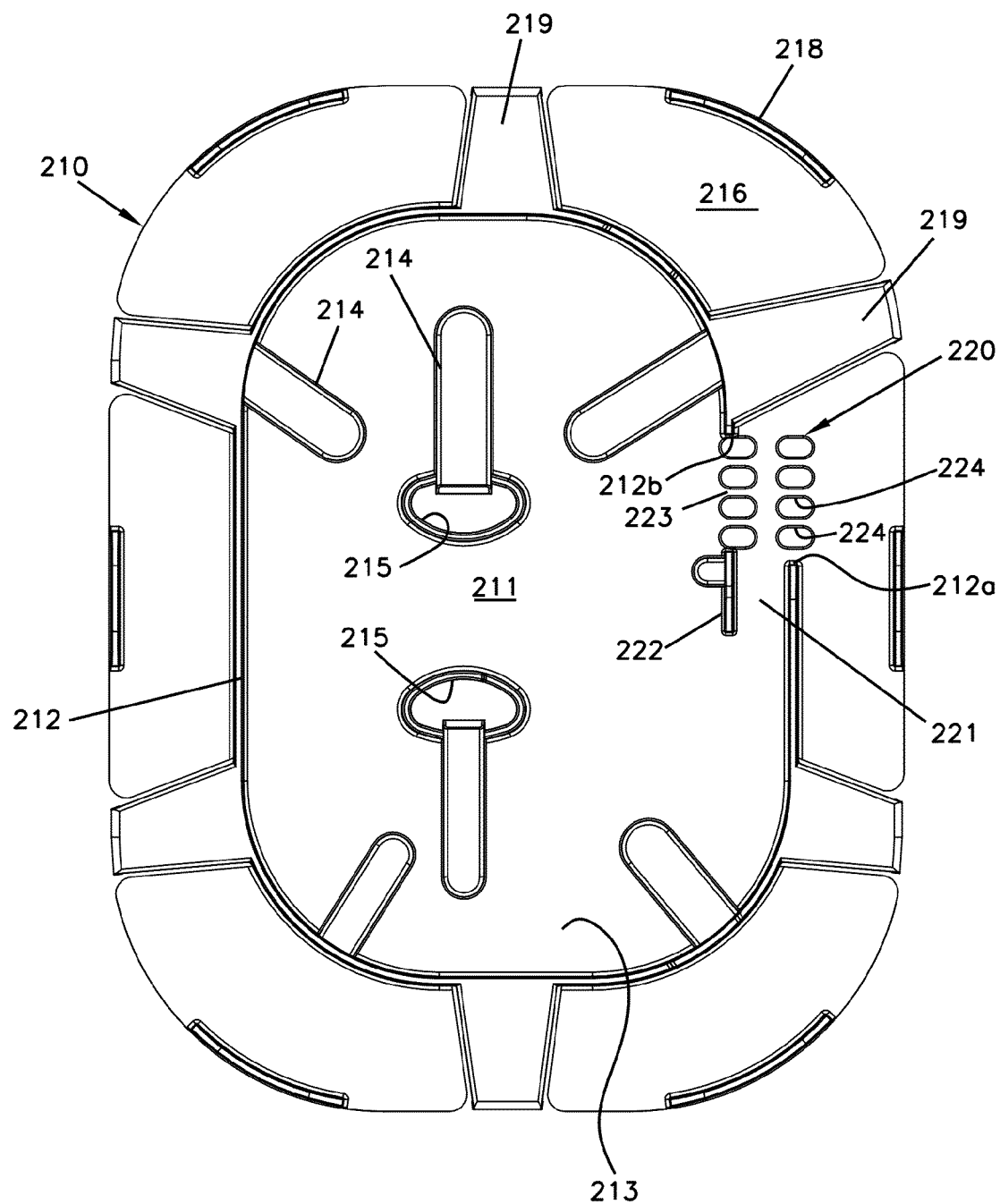
FIG. 5 is a top plan view of the base of FIG. 3.
Figure 6:
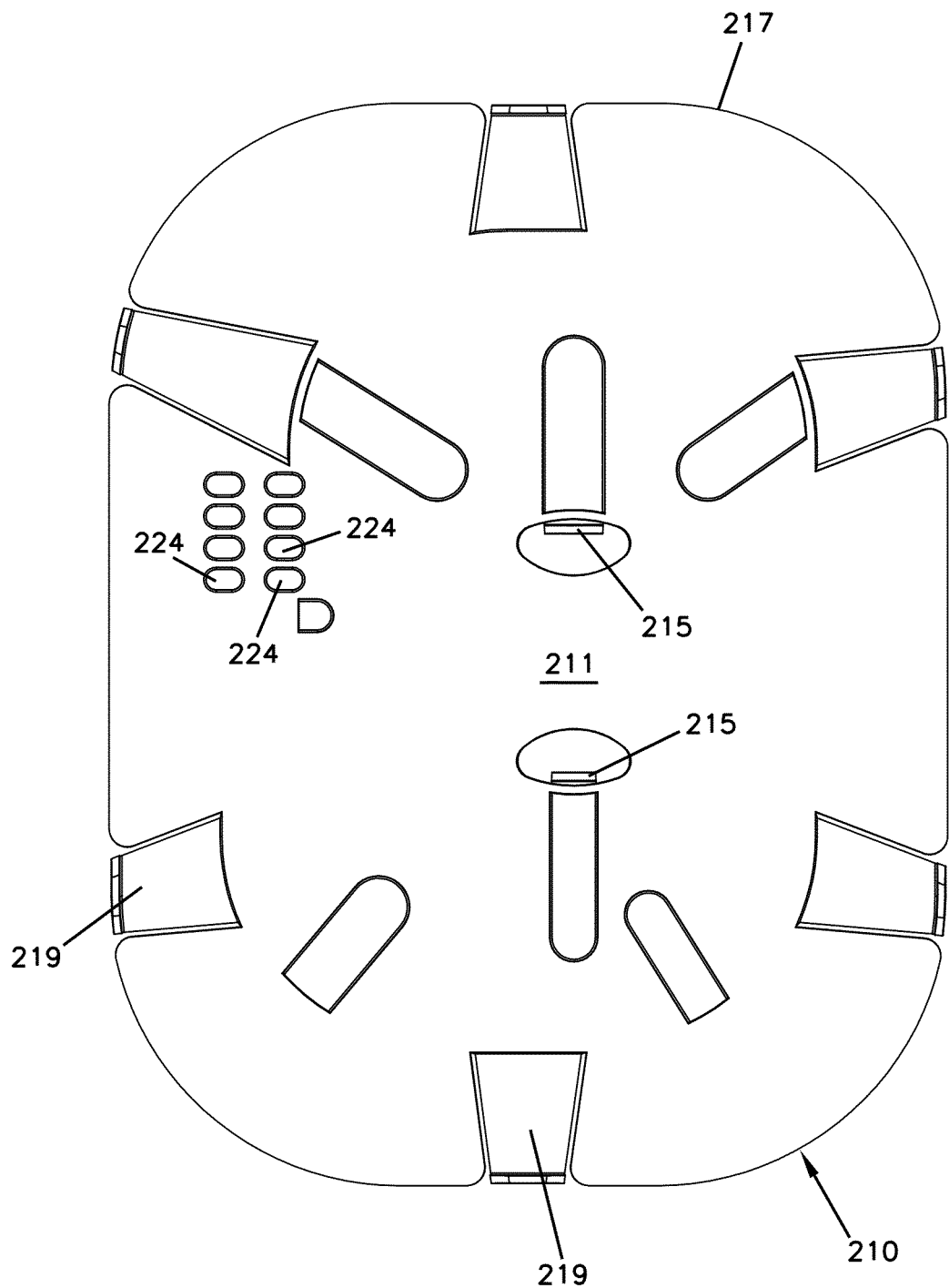
FIG. 6 is a bottom plan view of the base of FIG. 3.

FIG. 2 is a perspective view of an example splice cassette 200 including a base 210, a cover 230, and a splice chip 250 shown exploded outwardly from each other. The splice cassette 200 has a first side 202 and an opposite second side 204. The cover 230 defines a portion of the first side 202 and the base 210 defines the second side 204. The splice cassette 200 also includes opposite elongated sides 206 extending between the first and second sides 202, 204 of the cassette 200. Opposite ends 208 extend between the opposite sides 206 and between the first and second sides 202, 204.

The splice chip 250 is positioned to be enclosed by the base 210 and cover 230 when the cover 230 is mounted to the base 210. In particular, the base 210 defines an inner space 213 bounded by a spool 212. The cover 230 is sized and shaped to seat on the spool 212 and extend over the inner space 213. In certain implementations, the splice chip 250 mounts to the cover 230 and includes latching fingers 258 that extend towards the base 210 when the cover 230 is mounted to the base 210. The splice chip 250 is configured to hold one or more splices as will be disclosed in more detail herein.

FIGS. 3-6 illustrate one example base 210 suitable for use with splice cassette 200. The base 210 includes a panel 211 having a surface that defines the second side 204 of the splice cassette 200 (see FIG. 4). A spool wall 212 extends upwardly from an opposite surface of the panel 211. The spool wall 212 bounds and defines an inner region 213 of the base 210. One or more latch receivers 215 are disposed within the inner region 213. One or more inner retention fingers 214 extend inwardly from the spool wall 212 and/or outwardly towards the latch receivers 215 within the inner region 213. The inner retention fingers 214 extend generally parallel to the panel 211.

One or more flanges 217 extend radially outwardly from the panel 211 at the spool wall 212 to form an outer channel 216. In certain implementations, the flanges 217 extend parallel to the panel 211. In certain implementations, the flanges 217 are integral with the panel 211. In certain implementations, the flanges 217 are circumferentially spaced apart to provide finger-room to facilitate routing cables around the outer channel 216. Cable retainers 218 extend upwardly from the distal ends of the flanges 217 and outer retention fingers 219 extend radially outwardly from the spool 212 to further define the outer channel 216 and aid in retaining the cables within the outer channel 216.

The base 210 also defines a transition region 220 at which the outer channel 216 connects to the inner region 213. In particular, a transition channel 221 extends from the outer channel 216 to the inner region 213 (see FIG. 5). In the example shown, the transition channel 221 is formed by an offset between first and second ends 212a, 212b of the spool wall 212. The transition channel 221 is further defined by a transition guide 222 that extends parallel to a second end 212b of the spool wall 212. A gap 223 separates the second end 212b of the spool wall 212 and the transition guide 222.

One or more openings 224 are defined through a bottom surface of the cassette 200 at the transition region 220. In certain implementations, the openings 224 are defined through the panel 211. In other implementations, the openings 224 are defined through one or more of the flanges 217. In still other implementations, the openings 224 are defined through both the panel 211 and one or more flanges 217. In the example shown, eight openings 224 are defined through a flange 217 in alignment with the gap 223 between the spool wall 212 and the transition guide 222. In other implementations, a greater or lesser number of openings 224 may be provided. The openings 224 facilitate securing cables transitioning between the outer channel 216 and the inner region 213 to the base 210 with cable fasteners as will be described in more detail herein.

FIGS. 7-10 illustrate one example cover 230 suitable for use with splice cassette 200. The cover 230 has a splice region 245 at which a splice chip 250 can be mounted. The cover 230 is sized and shaped to extend over the inner region 213 defined by the spool wall 212. The cover 230 has an inwardly-facing surface 231 (see FIG. 9) and an opposite outwardly-facing surface 232 (see FIG. 10). When the cover 230 is coupled to the base 210, the inwardly-facing surface 231 faces, but is spaced from the panel 211 of the base 210. Support flanges 233 extend radially outwardly from the cover 230 to seat on the spool wall 212 when the cover 230 is coupled to the base 210.

The cover 230 defines one or more finger grip detents 234 that define concave recesses in the outwardly facing surface 232. The finger grip detents 234 facilitate grasping the cover 230 to mount the cover 230 to the base 210 and/or to remove the cover 230 from the base 210. In the example shown, the cover 230 defines two finger grip detents 234 that are spaced apart along a length of the cassette 200. In certain implementations, the finger grip detents 234 are defined by convex protrusions extending from the inwardly-facing surface 231.

One or more flexible latch fingers 235 extend from the inwardly-facing surface 231. The latch fingers 235 are positioned to align with the latch receivers 215 of the base 210 when the cover 230 is coupled to the base 210. In the example shown, two latch fingers 235 are spaced apart along a length of the cover 230 and face in opposite directions. The latch fingers 235 are configured to extend into wells defined by the receivers 215 of the base 210 and to snap-fit to structures within the wells. The snap-fit connection between the fingers 235 and the receivers 215 may be overcome by a user pulling upon the finger grip detents 234.

The cover 230 includes outer guides 237 and inner guides 241 to route optical fibers from the base 210 to the splice region 245 of the cover 230. The outer guides 237 are configured to facilitate retaining the optical fibers within the perimeter of the cover 230. The inner guides 241 are configured to alter the routing direction of the optical fibers and/or facilitate storage of excess fiber length. In the example shown, the inner guides 241 and the splice region 245 are disposed within a boundary defined by the outer guides 237. A transition region 236 extends radially outwardly from the outer guides 237 to cooperate with the transition region 220 of the base 210 to protect the optical fibers as the fibers are routed from the base 210 to the cover 230 (see FIG. 9).

Figure 7:
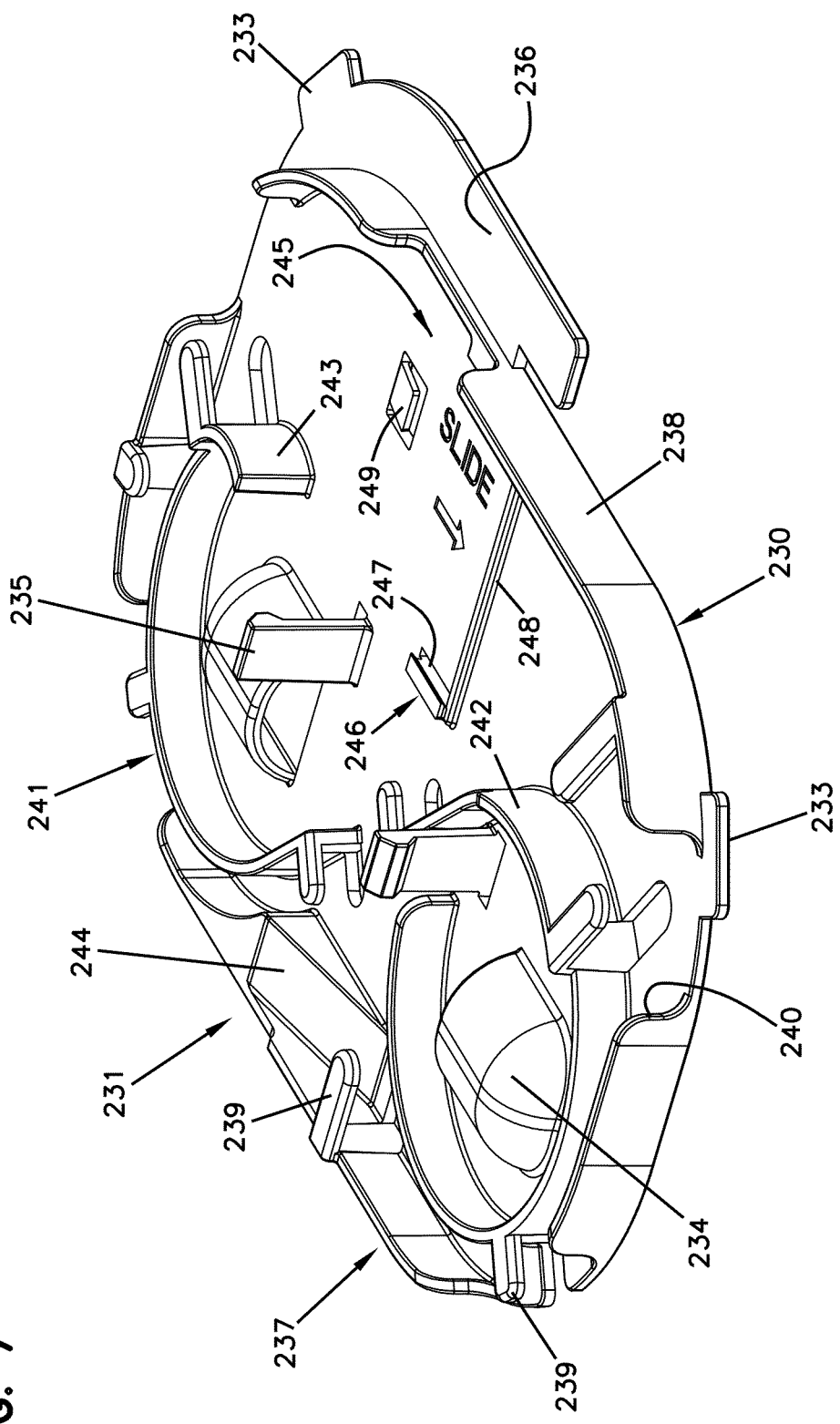
FIG. 7 is a top perspective view of an example cover suitable for use with the splice cassette of FIG. 2.
Figure 8:
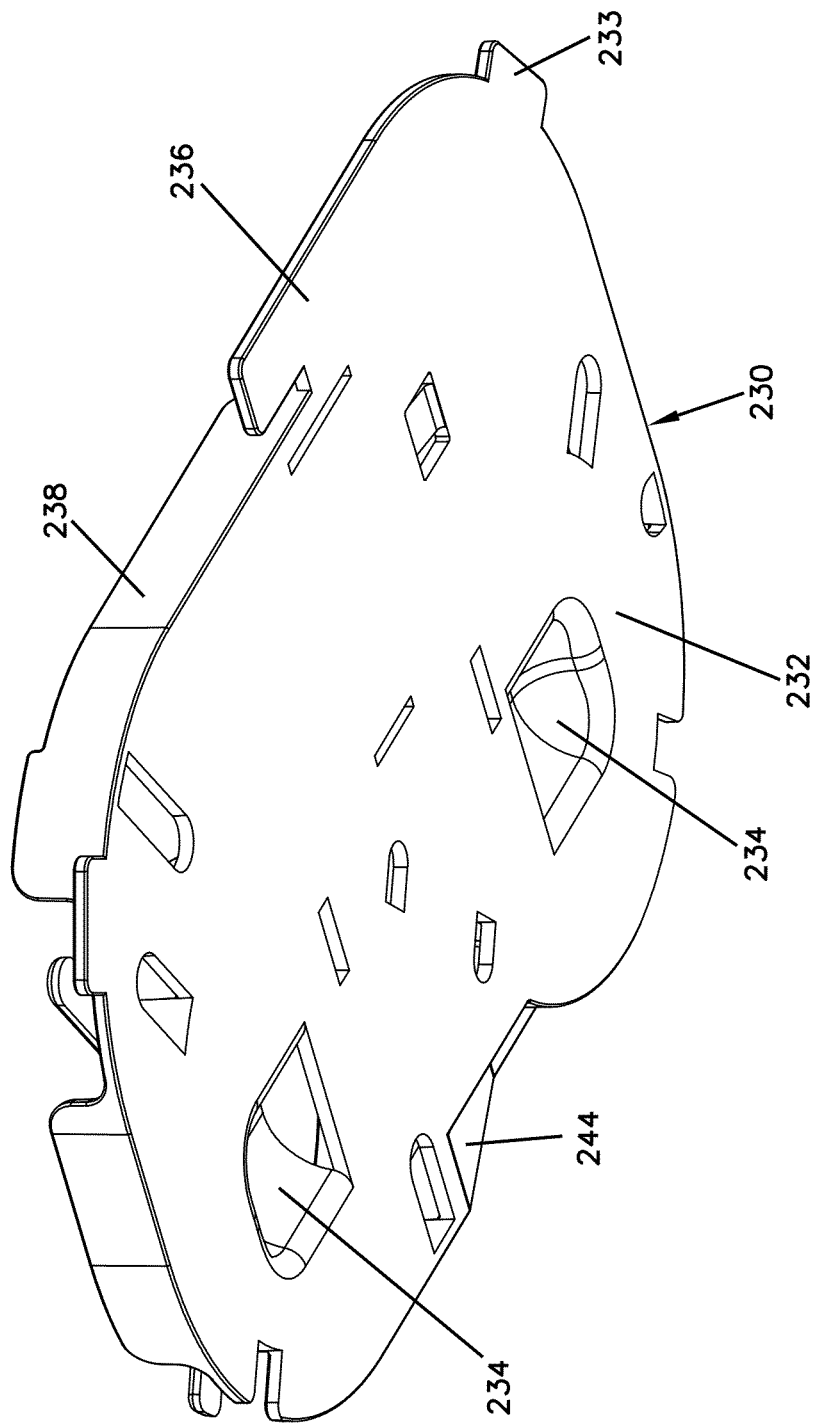
FIG. 8 is a bottom perspective view of the cover of FIG. 7.
Figure 9:
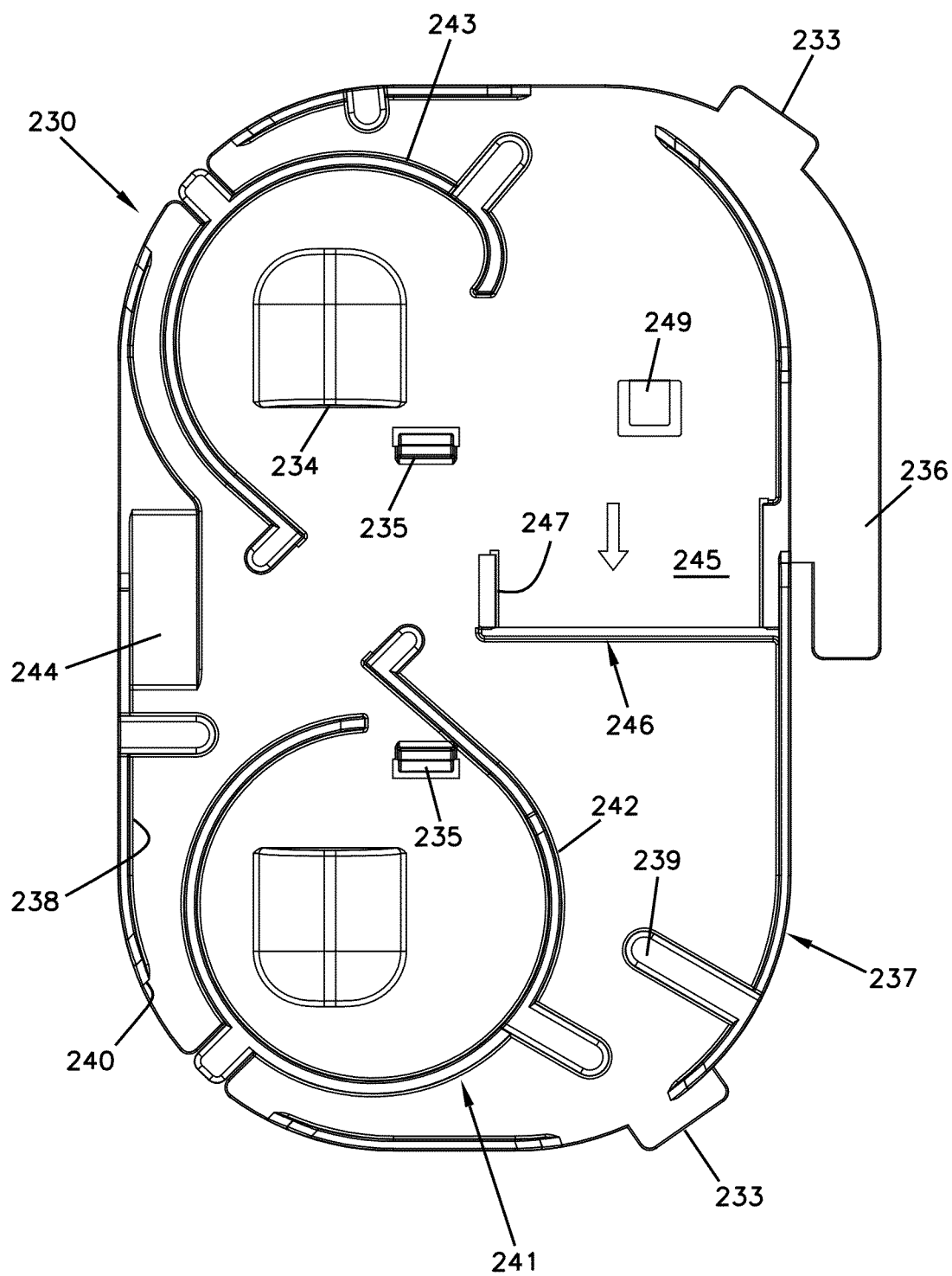
FIG. 9 is a top plan view of the cover of FIG. 7.
Figure 10:
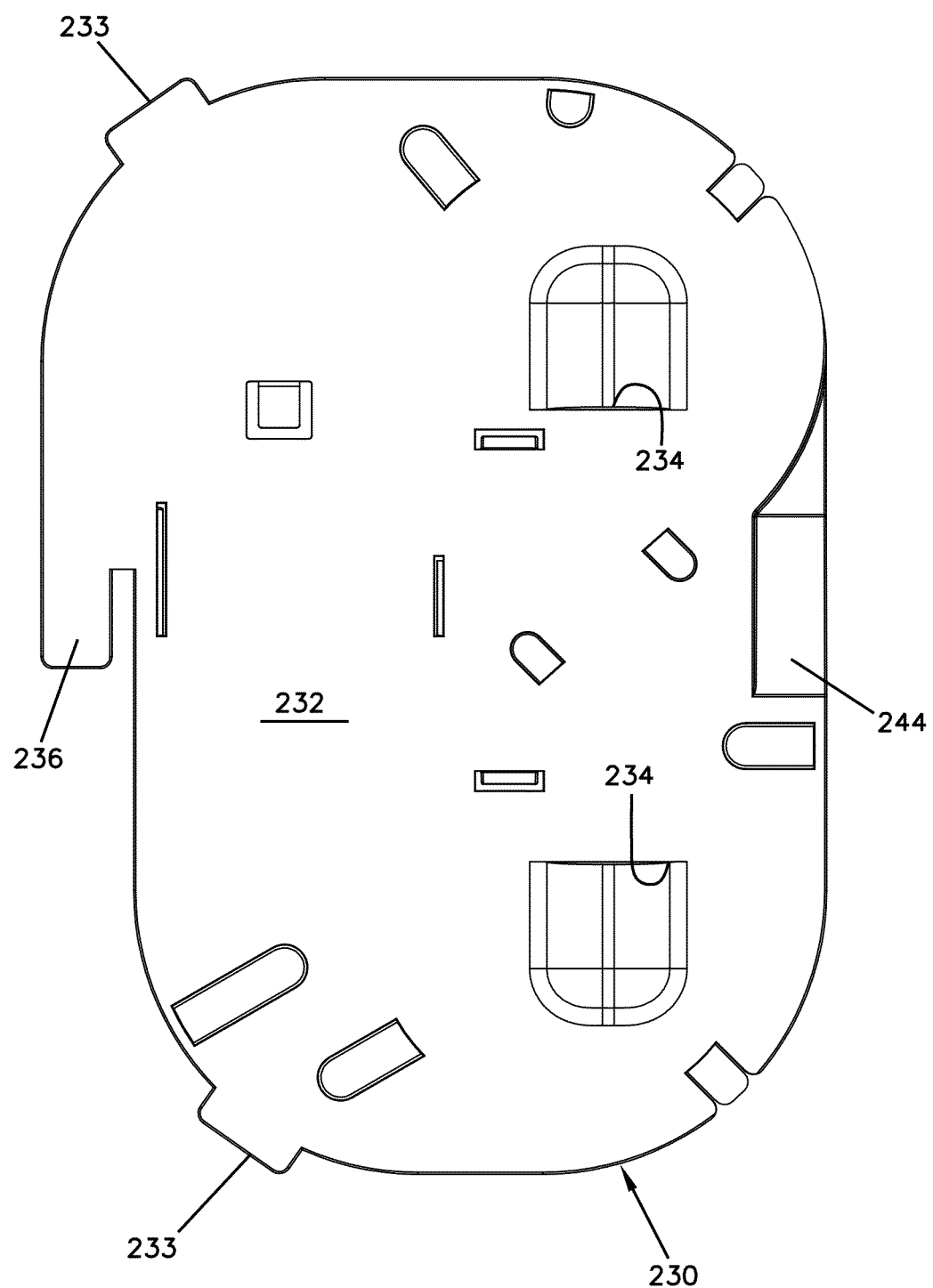
FIG. 10 is a bottom plan view of the cover of FIG. 7.
Figure 11:
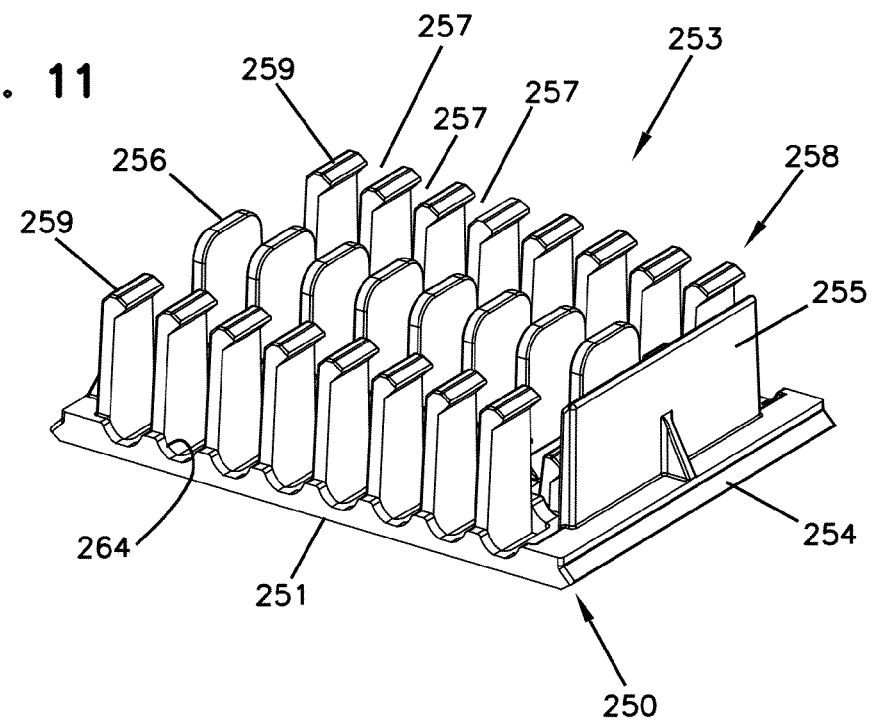
FIG. 11 is a first end perspective view of an example splice chip suitable for use with the splice cassette of FIG. 2.
Figure 12:
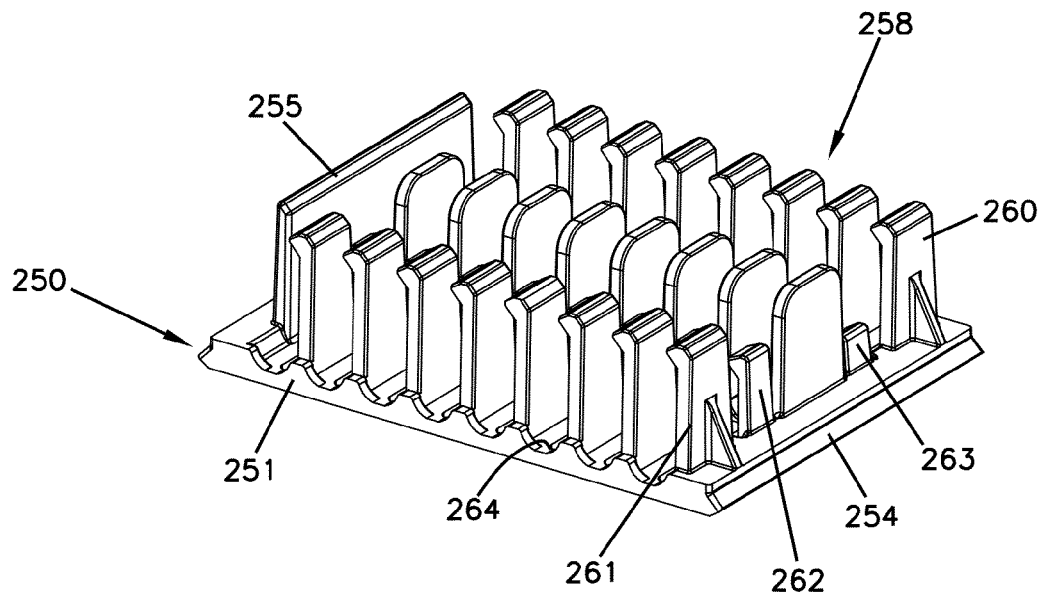
FIG. 12 is a second end perspective view of the splice chip of FIG. 11.

As shown in FIG. 7, the outer guides 237 include a side wall 238 extending along a periphery of the cover 230. The outer sidewall 238 defines gaps or breaks 240 to facilitate finger access to optical fibers routed within the outer guides 237. The outer sidewall 238 adjacent the transition region 236 provides bend radius protection for optical fibers routed onto the cover 230. One or more retention fingers 239 extend from the guides 237, 241 parallel to the inwardly-facing surface 231 of the cover 230. The retention fingers 239 aid in managing the optical fibers routed about the guides 237, 241.

The inner guides 241 form a storage arrangement on the cover 230. The inner guides 241 include a first spool 242 and a second spool 243. The spools 242, 243 are positioned so that one or more optical fibers may be looped in a figure-8 or S-shaped pattern around the spools 242, 243 on the cover 230. The inner guides 241 also are positioned relative to the outer guides 237 to form an outer channel in which the optical fibers may be routed in a loop. A ramp 244 is disposed on the inwardly-facing surface 231 of the cover 230 and is oriented to extend along the length of the cover 230. The ramp 244 aids in routing optical fibers between the cover 230 and the base 210 as will be described in more detail herein.

In the example shown, one of the spools 242, 243 defines a substantially complete spool and another of the spools 242, 243 defines a partial spool. In other implementations, both spools 242, 243 may be complete spools or both spools 242, 243 may be partial spools. In the example shown, each spool 242, 243 at least partially surrounds a finger-grip detent 234. In certain implementations, the inner guides 241 are positioned closer to one of the elongated sides of the cover 230 than the other.

A chip receiving arrangement 246, which is configured to secure a splice chip 250 to the cover 230, is disposed at the splice region 245 of the cover 230. When the cover 230 is mounted to the base 210, the splice chip 250 is held within the inner region 213 of the base 210 between the base panel 211 and the inwardly-facing surface 231 of the cover 230. The chip receiving arrangement 246 includes one or more guides 247 along which the splice chip 250 can slide, a stop 248 against which the splice chip 250 abuts when mounted in the arrangement 246, and a flexible ramp 249 or other latching member that locks the chip 250 into position.

In the example shown, the chip receiving element 246 includes the stop 248 extend between two spaced apart parallel guides 247 that define channels in which edges of the splice chip 250 (see FIG. 13) may slide. The splice chip 250 is configured to be slid along the guides 247 until an edge of the splice chip 250 abuts the stop 248. When the splice chip 250 has been slid over the ramp 249, the ramp 249 snaps or springs to an initial position to lock the splice chip 250 in position. The guides 247 hold the splice chip 250 to the cover 230 and inhibit lateral movement of the splice chip 250. The stop 248 and flexible ramp 249 inhibit axial movement of the splice chip 250 along the sliding axis of the splice chip 250.

Figure 13:
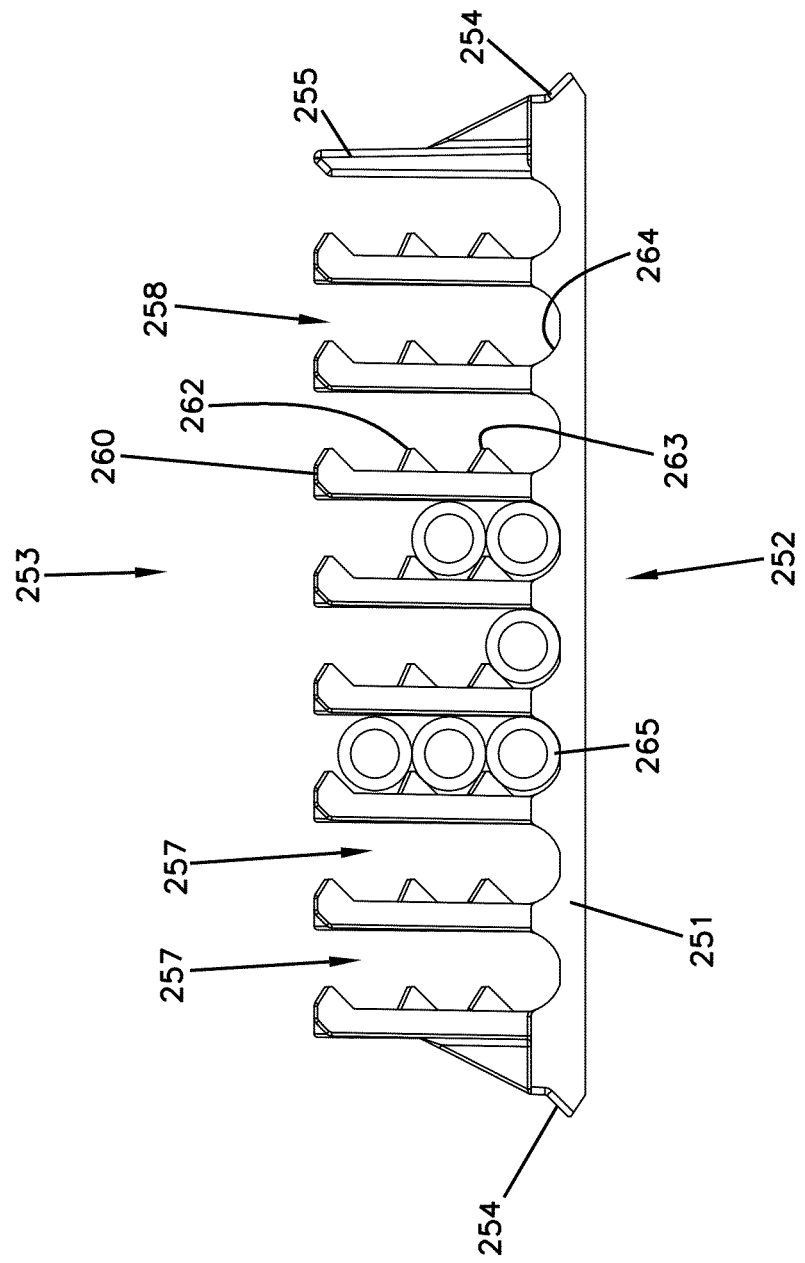
FIG. 13 is a side elevational view of the splice chip of FIG. 11.

FIGS. 11-16 illustrate one example splice chip 250 that is suitable for use with the splice cassette 200 described above. The splice chip 250 is configured to hold one or more splices 265 (FIG. 13). In certain implementations, the splice chip 250 is configured to hold single fusion splices. Of course, other types of splice chips may be utilized with the above-described splice cassette 200. For example, another example splice chip suitable for use with the above described cassette 200 is disclosed herein with reference to FIGS. 22-28. Yet another example splice chip suitable for use with the above described cassette 200 is disclosed in U.S. Pat. No. 7,684,669, the disclosure of which is hereby incorporated herein by reference. In still other implementations, the splice chip 250 may be used with other types of splice cassettes, such as the splice wheel disclosed in U.S. Pat. No. 6,480,660, the disclosure of which is hereby incorporated herein by reference.

The example splice chip 250 includes a base section 251 having a first side 252 and a second side 253. The first side 252 of the base section 251 is generally flat and configured to slide over the inwardly-facing surface 231 of the cover 230 to mount the splice chip 250 to the chip receiving element 246. In the example shown, opposite ends of the base section 251 define guide edges 254 shaped to complement the channels defined by guides 247. For example, the guide edges 254 shown in FIG. 13 have a tapered or triangular cross-section protruding laterally from the ends of the base section 251. In other implementations, the guide edges 254 may be formed on adjacent ends or on sections that are angled relative to each other.

In some implementations, the splice chip 250 has a length ranging from about one inch to about two inches. In certain implementations, the splice chip 250 has a length ranging from about 1.1 inches to about 1.5 inches. In one example implementation, the length of the splice chip is about 1.4 inches. In one example implementation, the length of the splice chip is about 1.3 inches. In some implementations, the splice chip 250 has a width ranging from about 0.5 inches to about 1.5 inches. In certain implementations, the splice chip 250 has a width ranging from about 1.8 inches to about 1.2 inches. In one example implementation, the length of the splice chip is about 1.0 inches. In one example implementation, the length of the splice chip is about 1.1 inches. In one example implementation, the length of the splice chip is about 0.9 inches.

Figure 14:
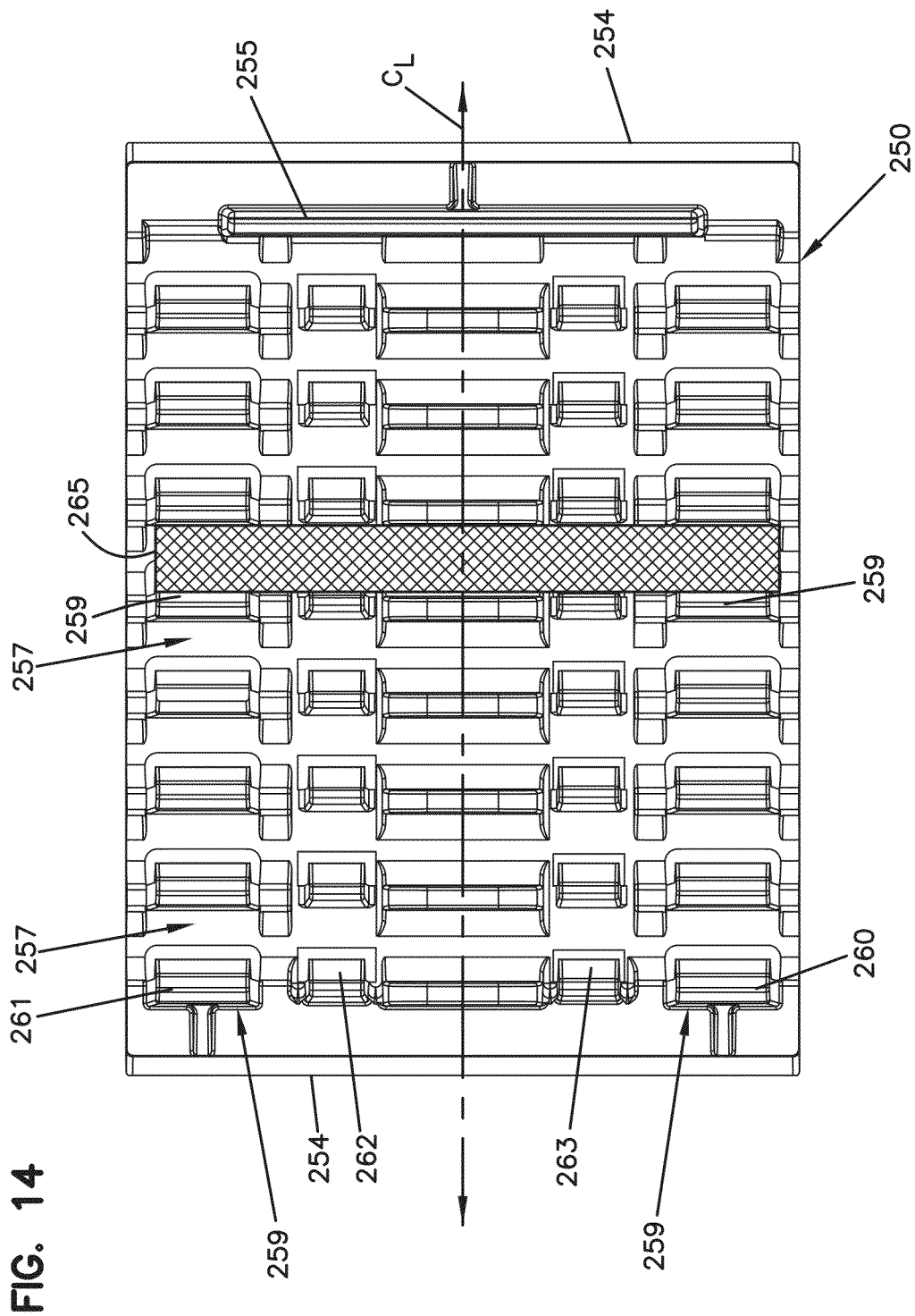
FIG. 14 is a top plan view of the splice chip of FIG. 11.
Figure 15:
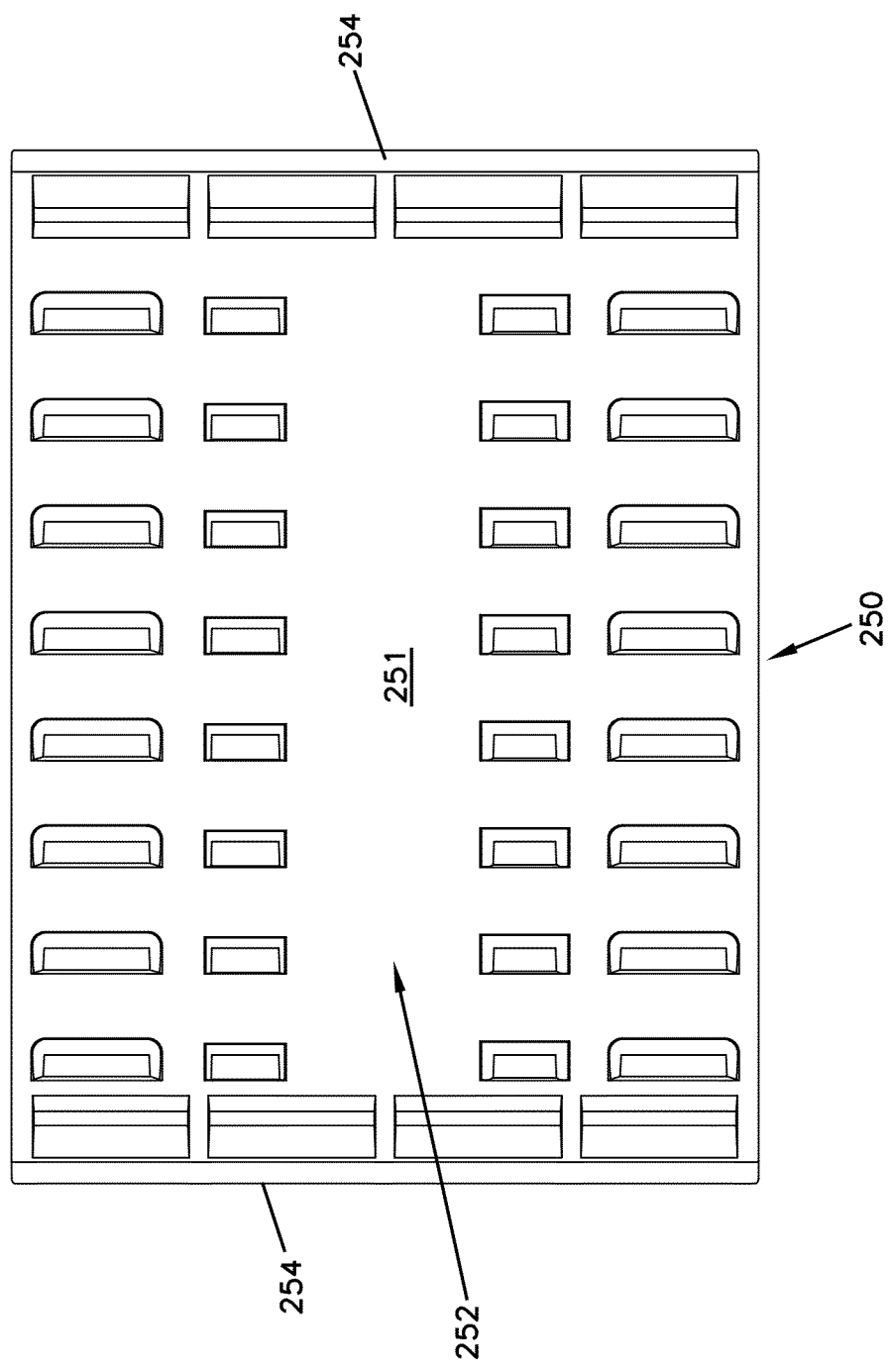
FIG. 15 is a bottom plan view of the splice chip of FIG. 11.
Figure 16:
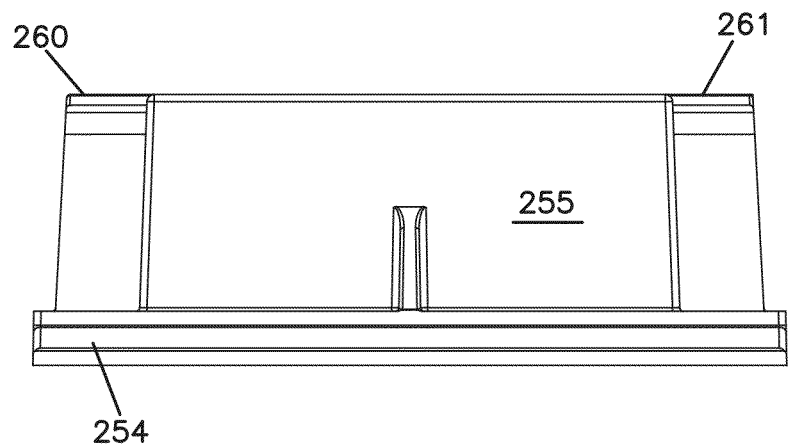
FIG. 16 is a first end elevational view of the splice chip of FIG. 11.
Figure 17:
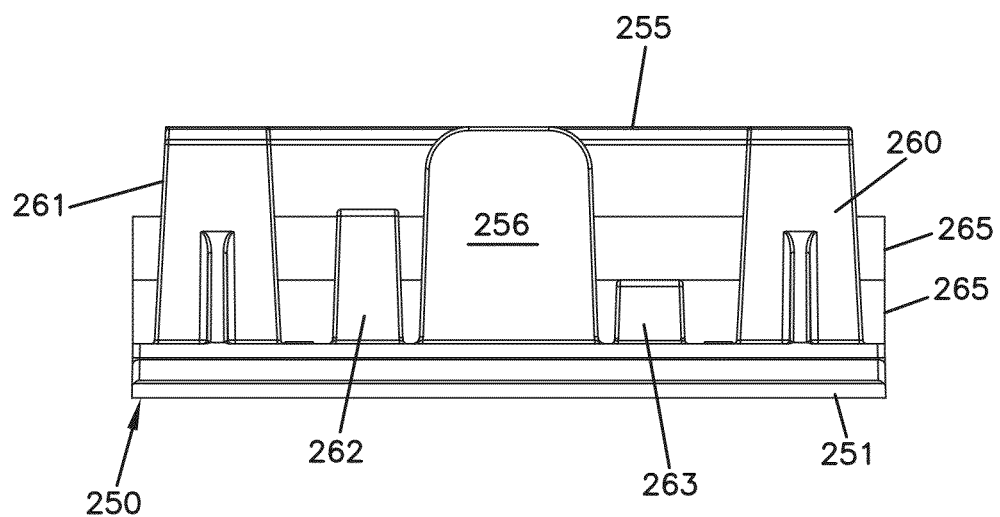
FIG. 17 is a second end elevational view of the splice chip of FIG. 11.

A support wall 255 extends upwardly from the second side 253 of the base section 251 at one end of the base section 251. One or more separation members 256 extend upwardly from the second side 253 of the base section 251 to form one or more splice receiving rows 257 (see FIGS. 13 and 14). In the example shown, the separation members 256 are spaced apart along an axis $C_L$ of the base section 251 between the guide edges 254. Each row 257 extends laterally across the base section 251 and is sized to receive at least one splice 265 therein (see FIGS. 13 and 14). In certain implementations, each row 257 defines a channel 264 in the base section 251 to aid in holding the splices 265. As shown in FIG. 14, the separation members 256 are arranged parallel to each other and to the support wall 255.

At least one latching finger 258 extends upwardly from the second side 253 of the base section 251 in lateral alignment with the separation member 256 of each row 257 to further define the row 257. The latching fingers 258 are configured to retain the splice couplings 265 within the rows 257. In particular, each latching finger 258 is configured to flex to facilitate insertion of the splice coupling 265 into the row 257. Each latching finger 258 includes a tab or lug that snaps over the splice coupling 265 to hold the coupling 265 within the row 257. In the example shown, the tab or lug extends towards the support wall 255. In some implementations, one or more of the rows 257 has an even number of latching fingers 258. In other implementations, each row includes an odd number of latching fingers.

In some implementations, at least one of the latching fingers 258 of one of the rows 257 has the same height as another of the latching fingers 258 of the row 257. In certain implementations, all of the latching fingers 258 of the row 257 have the same height. In other implementations, however, at least one of the latching fingers 258 of a row 257 has a different height than another latching finger 258 of the same row 257. In certain implementations, at least one of the rows 257 may include a latching member 258 having a first height, another latching member 258 having a second height that is different from the first height, and yet another latching member 258 having a third height that is different from the first and second heights.

Latching fingers 258 of different heights enable multiple splices 265 to be mounted in each row 257. For example, as shown in FIG. 13, a row 257 having latching tabs 258 of three different heights may configured to receive a stack of three splices 265. In other implementations, a row 257 may be configured to hold a greater or lesser number of splices 265. In certain implementations, a plurality of rows 257 of the splice chip 250 have latching fingers 258 of different heights to support multiple splices 265 in each row 257.

In some implementations, at least one of the rows 257 includes a pair 259 of latching fingers 258 having a common height. For example, in FIGS. 11 and 12, each row 257 includes a pair 259 of latching members 258 including a first latching finger 260 spaced laterally apart from a second latching finger 261. In certain implementations, the first and second latching fingers 260, 261 of each row 257 are disposed on opposite sides of the separation member 256 of the row 257. In the example shown, the first and second latching fingers 260, 261 are disposed at opposite sides of the base section 251. In certain implementations, all of the rows 257 include the pair 259 of latching members 258.

In some implementations, at least one of the rows 257 also includes at least a third latching member 262 that has a different height from the first and second latching members 260, 261. In the example shown, the third latching member 262 is shorter than the pair 259 of latching members. In other implementations, however, the third latching member 262 may be taller than the pair 259 of latching members. In some implementations, at least one of the rows 257 also includes at least a fourth latching member 263 that has a different height from the first, second, and third latching members 260, 261, 262. In the example shown, the fourth latching member 263 is shorter than the third latching member 262. In other implementations, however, the fourth latching member 263 may be taller than the third latching member 262 and/or the pair 259 of latching members.

In the example shown, each row 257 of the splice chip 250 includes four latching fingers 258. The first and second latching fingers 260, 261 are the tallest fingers 258 of the row 257 and are spaced the farthest apart along the row 257. The third latching finger 262 is disposed between the separation member 256 of the row 257 and the second latching finger 261. The third latching finger 262 is shorter than the first and second latching fingers. The fourth latching finger 263 is disposed between the separation member 256 of the row 257 and the first latching finger 260. The fourth latching finger 263 is shorter than the third latching finger 262. In other implementations, each row may include a greater or lesser number of latching fingers 258. In some such implementations, one of the additional latching fingers 258 may form a pair with one of the third or fourth latching fingers 262, 263.

Two or more optical fiber cables may be routed to the splice cassette 200 to splice together two or more optical fibers. Excess length of the cables may be stored at the cassette 200. For example, in some implementations, up to about six feet of jacketed cable may be stored in the outer channel 216 of the base 210 and up to about six feet of bare optical fiber may be stored in the inner region 213 of the base 210. In certain implementations, the inner region 213 of the base can store up to about sixty-six inches of bare optical fiber. In certain implementations, the inner region 213 of the base can store up to about five feet of bare optical fiber. In other implementations, the base 210 may be sized to store a greater or lesser amount of fibers and jacketed cables.

The splice cassette 200 receives at least one input cable and at least one output cable. Optical fibers contained within the input cable are spliced to optical fibers contained within the output cable. In certain implementations, the splice cassette 200 receives multiple input cables and/or multiple output cables. In some implementations, the jacketed cables received at the cassette 200 include cable jackets surrounding loose optical fibers. In certain implementations, the optical fibers are disposed in buffer tubes. In other implementations, the jacketed cables received at the cassette 200 include cable jackets surrounding ribbonized optical fibers. In some implementations, one of the cables received at the cassette 200 has ribbonized optical fibers and one of the cables received at the cassette 200 has loose optical fibers.

In some implementations, the input cables may have a cross-dimension of about 2 mm to about 8 mm. In certain implementations, the input cables may have a cross-dimension of about 3 mm to about 5 mm. In one example implementation, the input cable has a cross-dimension of about 3 mm. In one example implementation, the input cable has a cross-dimension of about 5 mm. In other implementations, the input cables may have a greater or lesser cross-dimension.

For example, the input cable can have a cross-dimension of about 900 μm. Certain types of input cables are sized to contain fiber ribbon matrices. In some implementations, the input cables have a round cross-section. In other implementations, the input cables have an oval or obround cross-section.

In some implementations, the output cables have a round cross-section. In other implementations, the output cables have an oval or obround cross-section. In certain implementations, the output cables may have a cross-dimension of about 3 mm. In other implementations, the input cables may have a greater or lesser cross-dimension.

Figure 24:
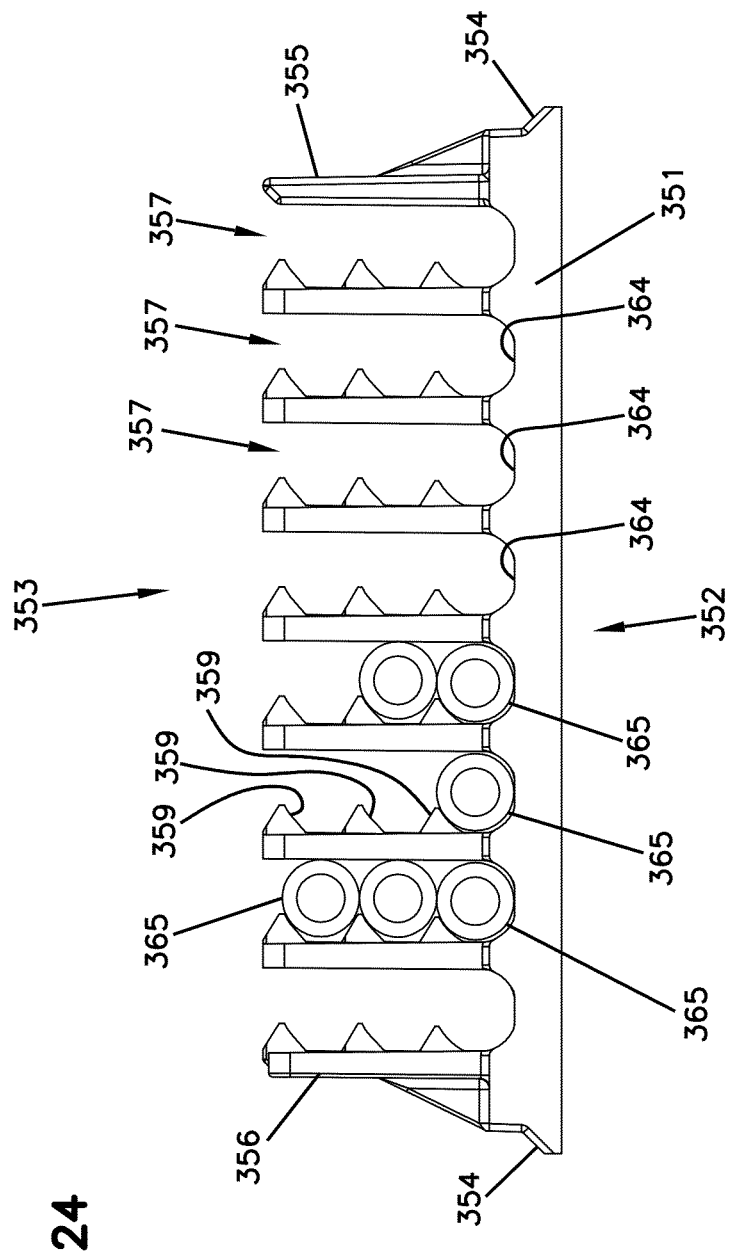
FIG. 24 is a side elevational view of the splice chip of FIG. 22.
Figure 25:
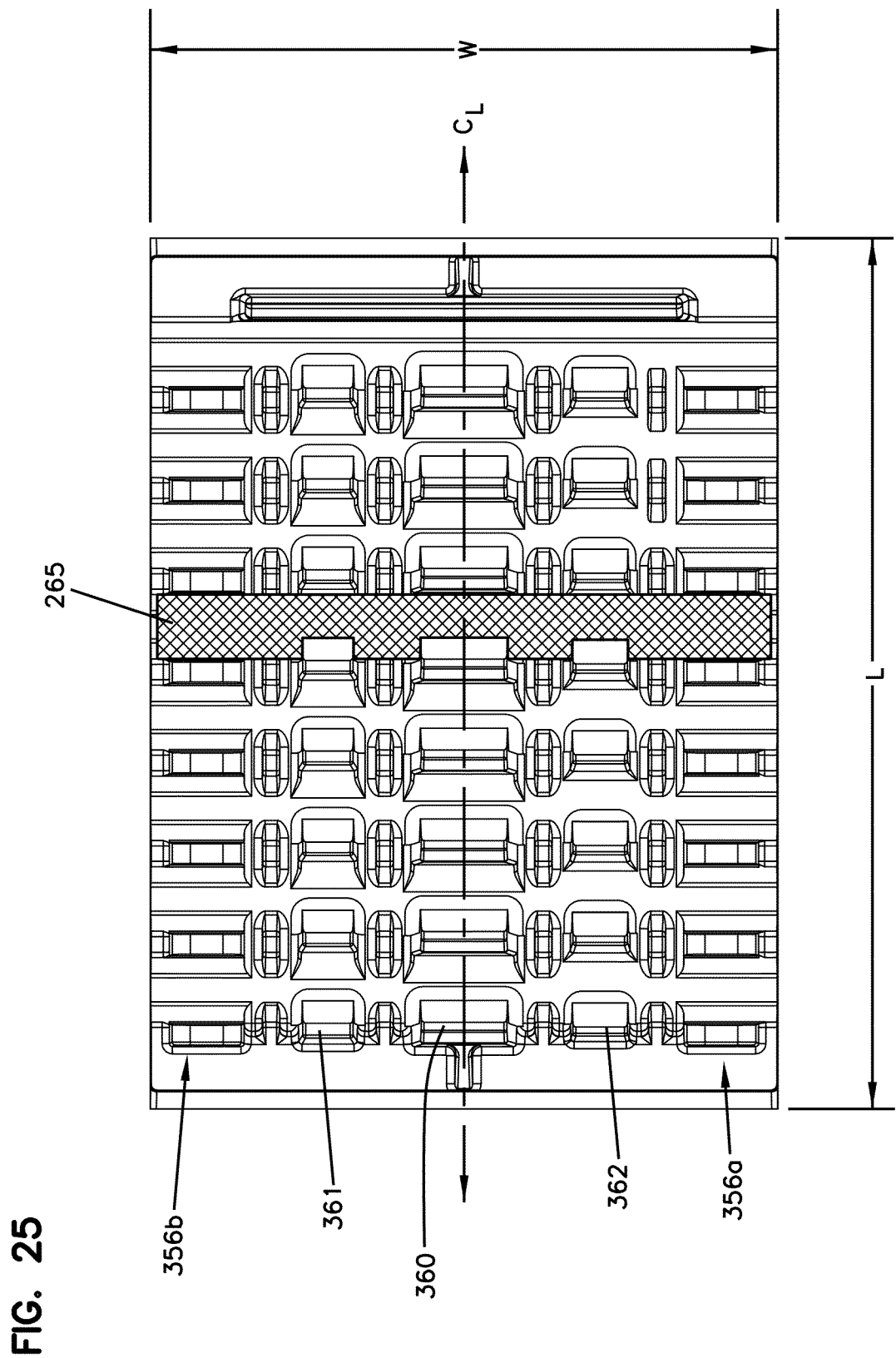
FIG. 25 is a top plan view of the splice chip of FIG. 22.
Figure 26:
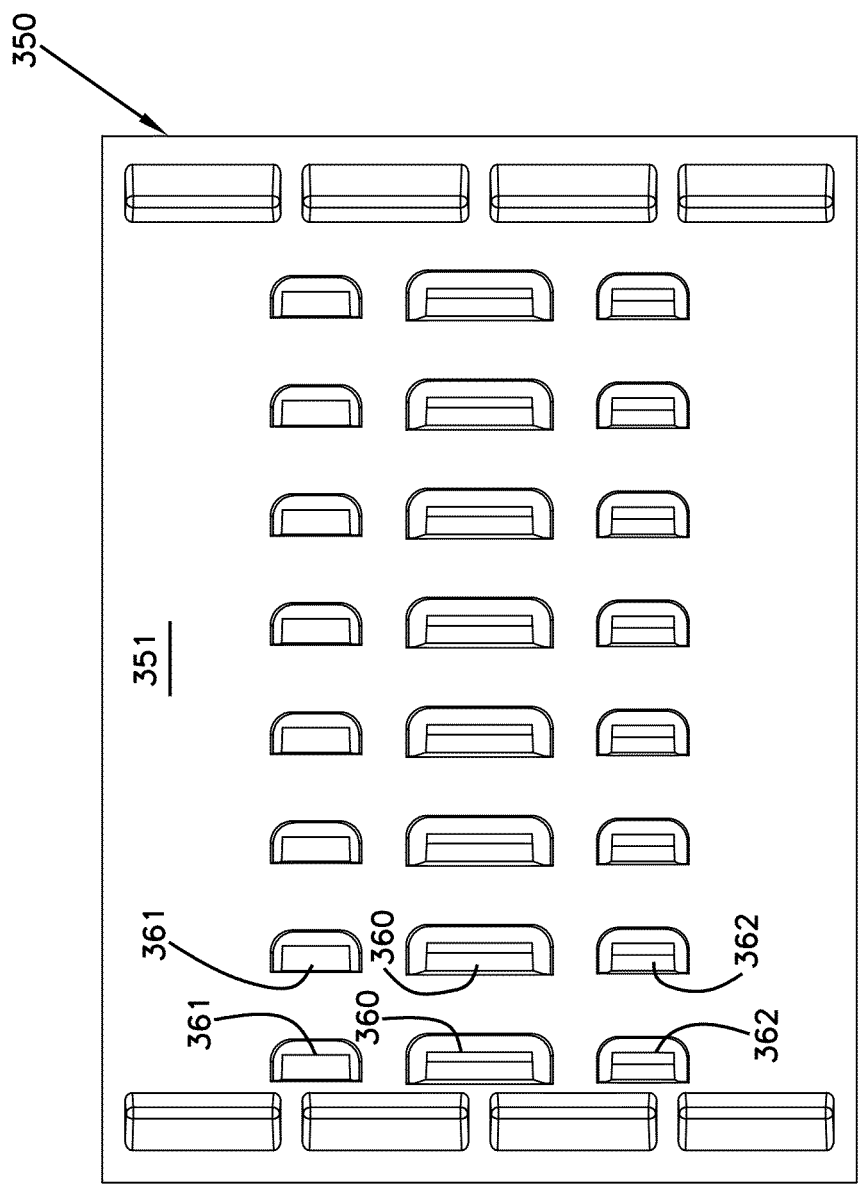
FIG. 26 is a bottom plan view of the splice chip of FIG. 22.
Figure 27:
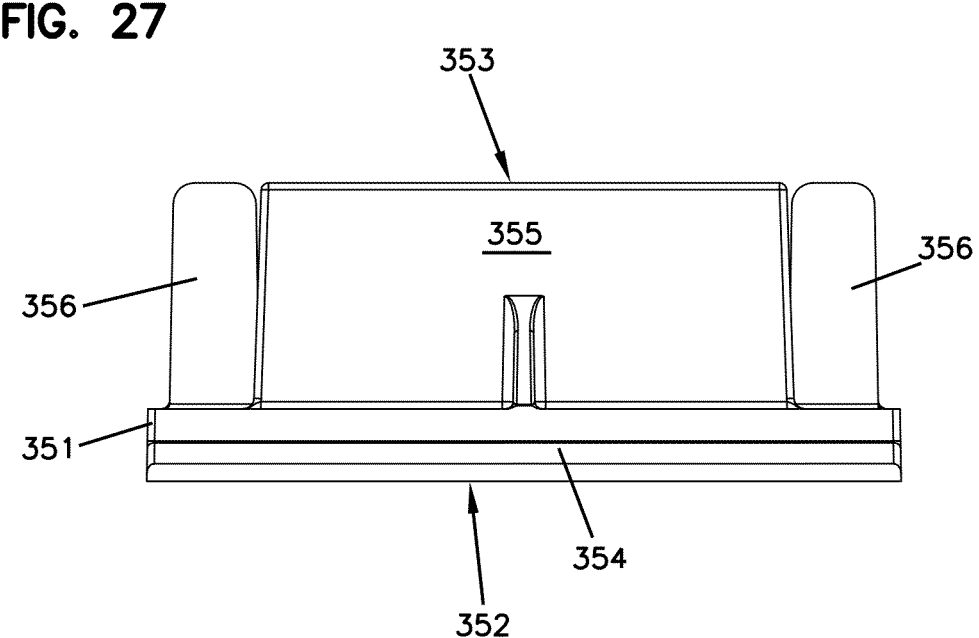
FIG. 27 is a first end elevational view of the splice chip of FIG. 22.

FIGS. 22-28 illustrate another example splice chip 350 that is suitable for use with the splice cassette 200 described above. The splice chip 350 is configured to hold one or more splices 365 (FIG. 24). In still other implementations, the splice chip 250 may be used with other types of splice cassettes, such as the splice wheel disclosed in U.S. Pat. No. 6,480,660, incorporated by reference above.

The example splice chip 350 includes a base section 351 having a first side 352 and a second side 353 (FIG. 24). The first side 352 of the base section 351 is generally flat and configured to slide over the inwardly-facing surface 231 of the cover 230 to mount the splice chip 350 to the chip receiving element 246. In the example shown, opposite ends of the base section 351 define guide edges 354 shaped to complement the channels defined by guides 247. For example, the guide edges 354 shown in FIG. 24 have a tapered or triangular cross-section protruding laterally from the ends of the base section 351. In other implementations, the guide edges 354 may be formed on adjacent ends or on sections that are angled relative to each other.

In some implementations, the splice chip 350 has a length L (FIG. 25) ranging from about one inch to about two inches. In certain implementations, the splice chip 350 has a length L ranging from about 1.1 inches to about 1.5 inches. In one example implementation, the length L of the splice chip 350 is about 1.4 inches. In one example implementation, the length L of the splice chip 350 is about 1.3 inches. In some implementations, the splice chip 350 has a width W (FIG. 25) ranging from about 0.5 inches to about 1.5 inches. In certain implementations, the splice chip 350 has a width W ranging from about 1.8 inches to about 1.2 inches. In one example implementation, the width W of the splice chip 350 is about 1.0 inches. In one example implementation, the width W of the splice chip 350 is about 1.1 inches. In one example implementation, the width W of the splice chip 350 is about 0.9 inches.

Figure 22:
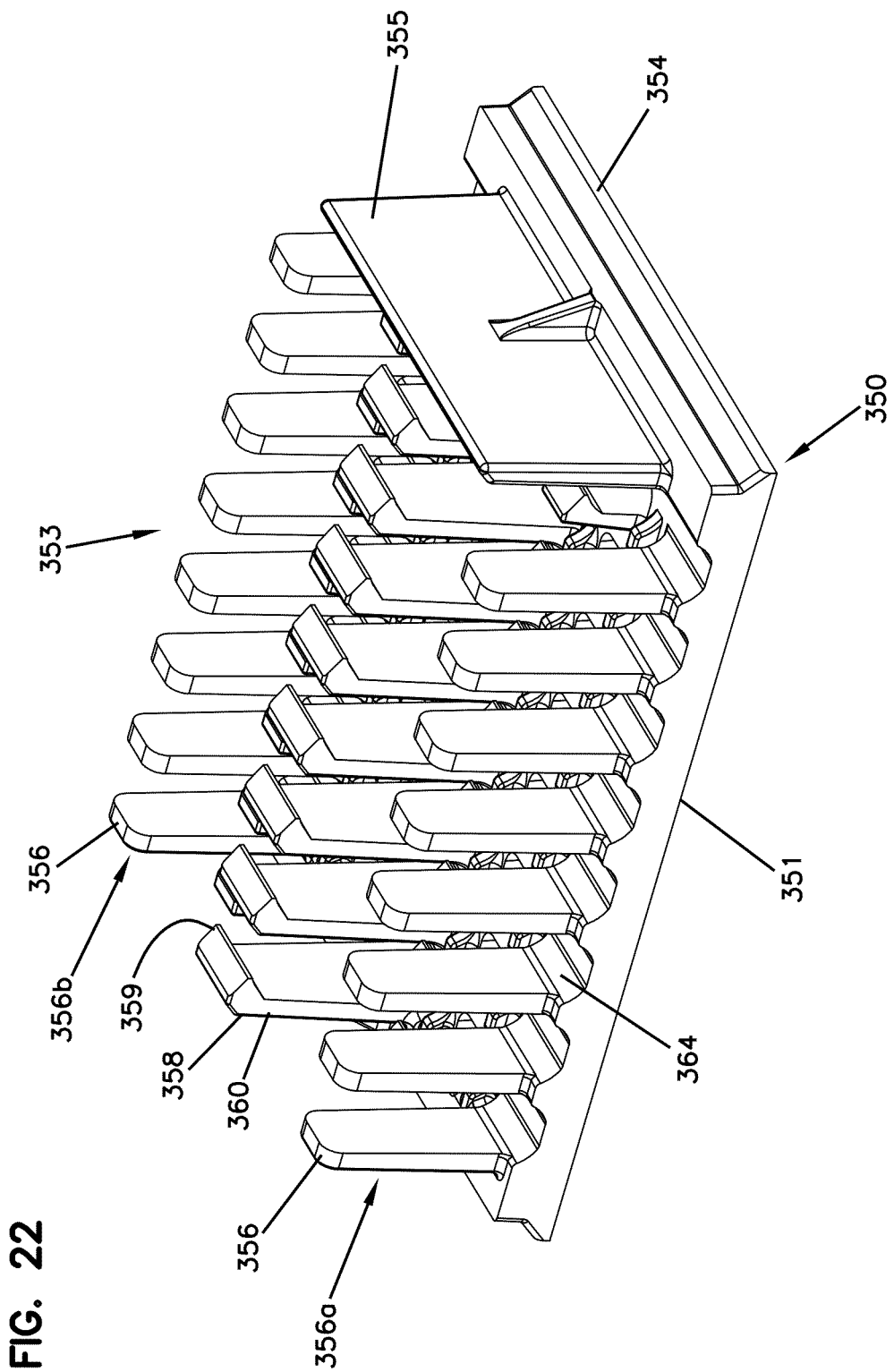
FIG. 22 is a first end perspective view of an example splice chip suitable for use with the splice cassette of FIG. 2.
Figure 23:
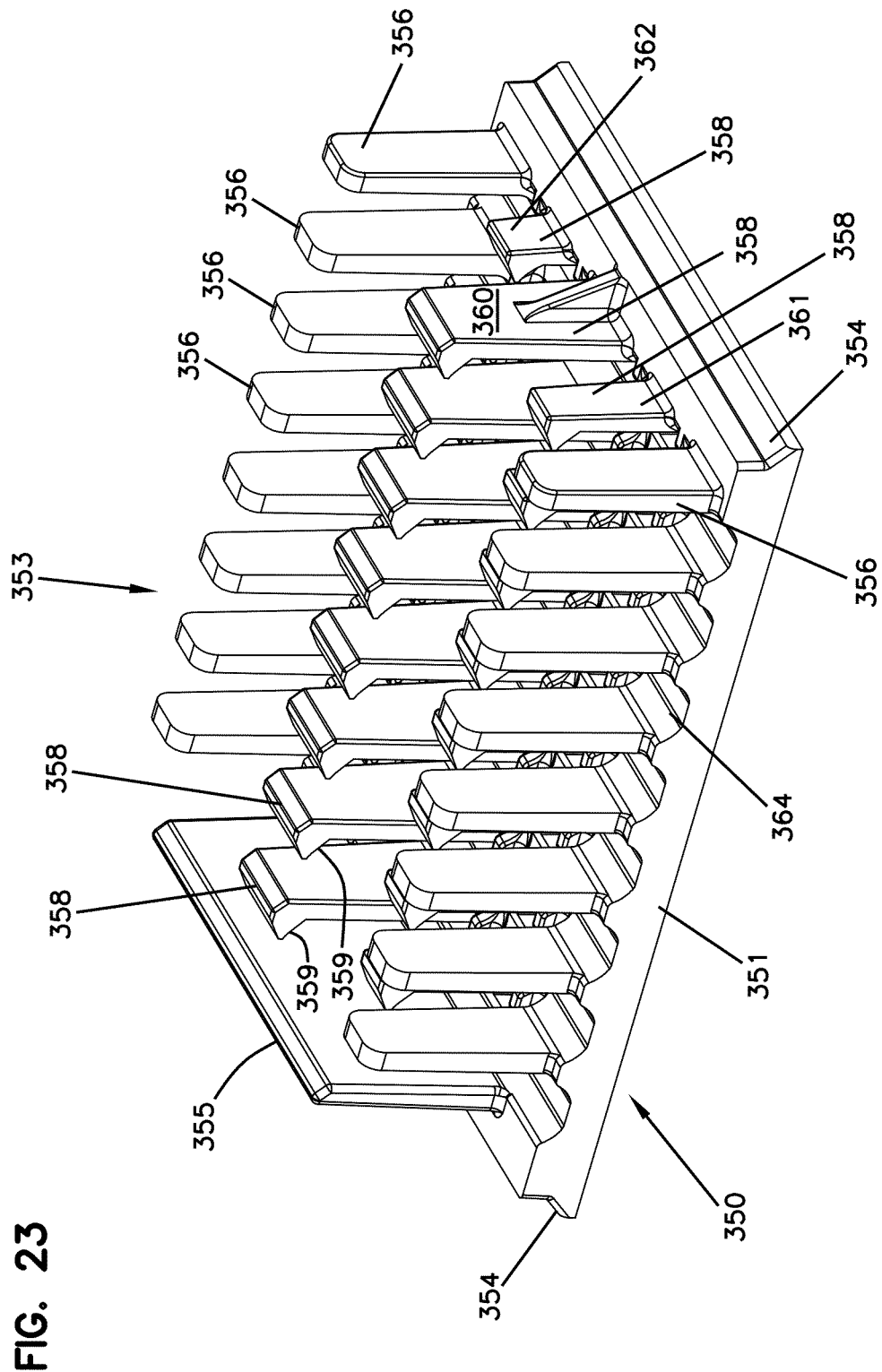
FIG. 23 is a second end perspective view of the splice chip of FIG. 22.

A support wall 355 extends upwardly from the second side 353 of the base section 351 at one end of the base section 351. As shown in FIG. 22, one or more separation members 356 extend upwardly from the second side 353 of the base section 351 to form one or more splice receiving rows 357 (FIG. 24). In certain implementations, one of the rows 357 is formed between one or more separation members 356 and the support wall 355. Each row 357 extends laterally across the width W of the base section 351 and is sized to receive at least one splice 365 therein (see FIGS. 24 and 25). In certain implementations, each row 357 defines a channel 364 in the base section 351 to aid in holding the splices 365.

The separation members 356 extend parallel to each other and to the support wall 355. In some implementations, the separation members 356 are formed in multiple columns. In certain implementations, the separation members 356 are disposed in a first column 356a and a second column 356b that extend along the length L of the splice chip 350 (see FIG. 25). In certain implementations, the first and second columns 356, 356b are spaced laterally apart from each other along the width W of the splice chip 350. In the example shown, laterally aligned separation members 356 of the first and second columns 356a, 356b are disposed on opposite sides of base section 351.

At least one latching finger 358 extends upwardly from the second side 353 of the base section 351 in lateral alignment with the separation member 356 of each row 357 to further define the row 357 (see FIG. 24). The latching fingers 358 are configured to retain the splice couplings 365 within the rows 357 (see FIGS. 24 and 25). In particular, each latching finger 358 is configured to flex to facilitate insertion of the splice coupling 365 into the row 357. Each latching finger 358 includes a tab, lug, or hook 359 that snaps over the splice coupling 365 to hold the coupling 365 within the row 357. In the example shown, the hook 359 extends towards the support wall 355 (FIG. 24). In some implementations, each row 357 includes an odd number of latching fingers 358. In other implementations, each row 357 has an even number of latching fingers 358.

In some implementations, at least one of the latching fingers 358 of a row 357 has a different height than another latching finger 358 of the same row 357. In certain implementations, at least one of the rows 357 may include a latching member 358 having a first height, another latching member 358 having a second height that is different from the first height, and yet another latching member 358 having a third height that is different from the first and second heights. Latching fingers 358 of different heights enable multiple splices 365 to be mounted in each row 357. For example, as shown in FIG. 24, a row 357 having latching tabs 358 of three different heights may be configured to receive a stack of three splices 365. In other implementations, a row 357 may be configured to hold a greater or lesser number of splices 365.

Figure 28:
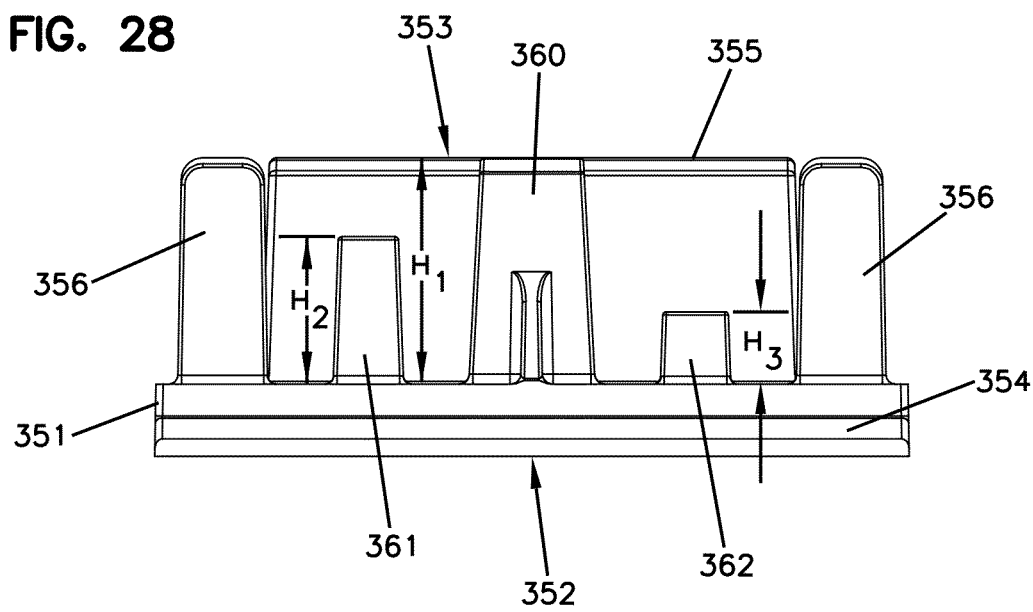
FIG. 28 is a second end elevational view of the splice chip of FIG. 22.

In some implementations, the latching fingers 358 may include a first type 360 of latching fingers 358 that have a first height H1, a second type 361 of latching fingers 358 that have a second height H2, and a third type 362 of latching fingers 358 that have a third height H3 (FIG. 28). In the example shown, the first height H1 is taller than the second height H2, which is taller than the third height H3. In other implementations, the splice chip 350 may include a greater or lesser number of types of latching finger types 360-362. In some implementations, a row 357 can include more than one latching finger 358 of the same type 360-362. In other implementations, no more than one latching finger 358 per type 360-362 is found in each row 357.

In some implementations, the different types of latching fingers 358 are disposed in separate columns along the length L of the base 351. For example, the latching fingers 358 of the first type 360 are disposed in a first column along an axis $C_L$ (FIG. 25) of the base section 351 between the guide edges 354. In the example shown, the axis $C_L$ is the central longitudinal axis of the base 351. The latching fingers 358 of the second type 361 are disposed in a second column laterally spaced from the first column and the latching fingers 358 of the third type 362 are disposed in a third column laterally spaced from the first column (see FIG. 25). In certain implementations, the three columns are disposed between the columns 356a, 356b of support members 356. In the example shown, the third column is disposed at an opposite side of the first column from the second column.

In the example shown, each row 357 of the splice chip 350 includes three latching fingers 358. The first finger 360 is the tallest finger 358 of the row 357 and is disposed at a center of the row 357. The second latching finger 361 is disposed between one of the separation members 356 of the row 357 and the first latching finger 360. The second latching finger 361 is shorter than the first latching finger 360. The third latching finger 362 is disposed between the other separation member 356 of the row 357 and the first latching finger 360. The third latching finger 362 is shorter than the second latching finger 361. In other implementations, each row 357 may include a greater or lesser number of latching fingers 358.

In some implementations, the splice chip 250, 350 to be coupled to the splice cassette 200 is configured to splice twenty-four optical fibers of one or more input cables to twenty-four optical fibers of one or more output cables. In certain implementations, the optical fibers of both the input and output cables are individually fusion spliced together. In certain example implementations, a single input cable may include twenty-four stranded fibers. In certain example implementations, a single input cable may include a fiber ribbon matrix having two rows of twelve fibers that are separated into individual fibers to be spliced individually. In certain example implementations, two output cables may include twelve stranded fibers. In other implementations, other permutations may be utilized for the number of cables and number of fibers.

In some implementations, the splice chip 250, 350 is configured to splice forty-eight optical fibers of an input cable to forty-eight optical fibers of one or more output cables. In certain implementations, four input cables and four output cables each include twelve stranded optical fibers. In certain implementations, the optical fibers of both the input and output cables are ribbonized before being spliced (e.g., in the field). In other implementations, the fibers of the input and/or the output cables may be ribbonized (e.g., at the factory). In other implementations, six input cables each include eight optical fibers (e.g., loose or ribbonized). In other implementations, other permutations may be utilized for the number of cables and number of fibers.

In other implementations, the splice chip 250, 350 may be configured to splice (e.g., mass fusion splice) together seventy-two optical fibers of an input cable to seventy-two optical fibers of one or more output cables. For example, in certain implementations, the input cables may include fiber ribbon matrices (e.g., six rows of twelve fibers, three rows of twenty-four fibers, etc.) contained within obround or oval jackets. In certain implementations, six output cables may each include twelve stranded fibers that are ribbonized in the field before being spliced to the input ribbon matrix. In other implementations, other permutations may be utilized for the number of cables and number of fibers.

Referring now to FIGS. 18-21, a routing process by which the optical cables may be spliced and stored in the splice cassette 200 will herein be described. First, the input and output cables are prepared for splicing. For example, jackets or buffer tubes may be stripped and removed from ends of the input and output cables to reveal the optical fibers (e.g., loose optical fibers, ribbonized optical fibers, etc.). In some implementations, a sufficient length of jacket or buffer tube is stripped to reveal a length of about three feet of optical fibers. In certain implementations, a sufficient length of jacket or buffer tube is stripped to reveal a length of about thirty-four inches of optical fibers. In certain implementations, a sufficient length of jacket or buffer tube is stripped to reveal a length of about twenty-nine inches of optical fibers.

In certain implementations, loose optical fibers may be ribbonized to facilitate mass fusion splicing of the optical fibers. In certain implementations, ribbonized fibers may be separated to facilitate individual fusion splicing of the optical fibers. The optical fibers of the input cable are spliced to the optical fibers of the output cables. For example, in certain implementations, ribbonized fibers may be mass fusion spliced together. In other implementations, separate optical fibers may be individually single fusion spliced together.

Splices 265, which may be covered by splice sleeves, are positioned over the fusion splice to protect the splice region of the fibers. The splices 265 are snapped or otherwise secured to the splice chip 250, 350. For example, one or more of the splices 265 may be seated in one or more of the rows 257 of the splice chip 250, 350 and retained by the latching fingers 258 of the splice chip 250, 350. In certain implementations, multiple splices 265 may be stacked in one row 257 before inserting a splice 265 in an adjacent row 265. In other implementations, a single splice 265 may be seated in each row 257 before stacking the splices 265 within the rows 257. In still other implementations, the splices 265 may be arranged as desired within the splice 250, 350.

Figure 18:
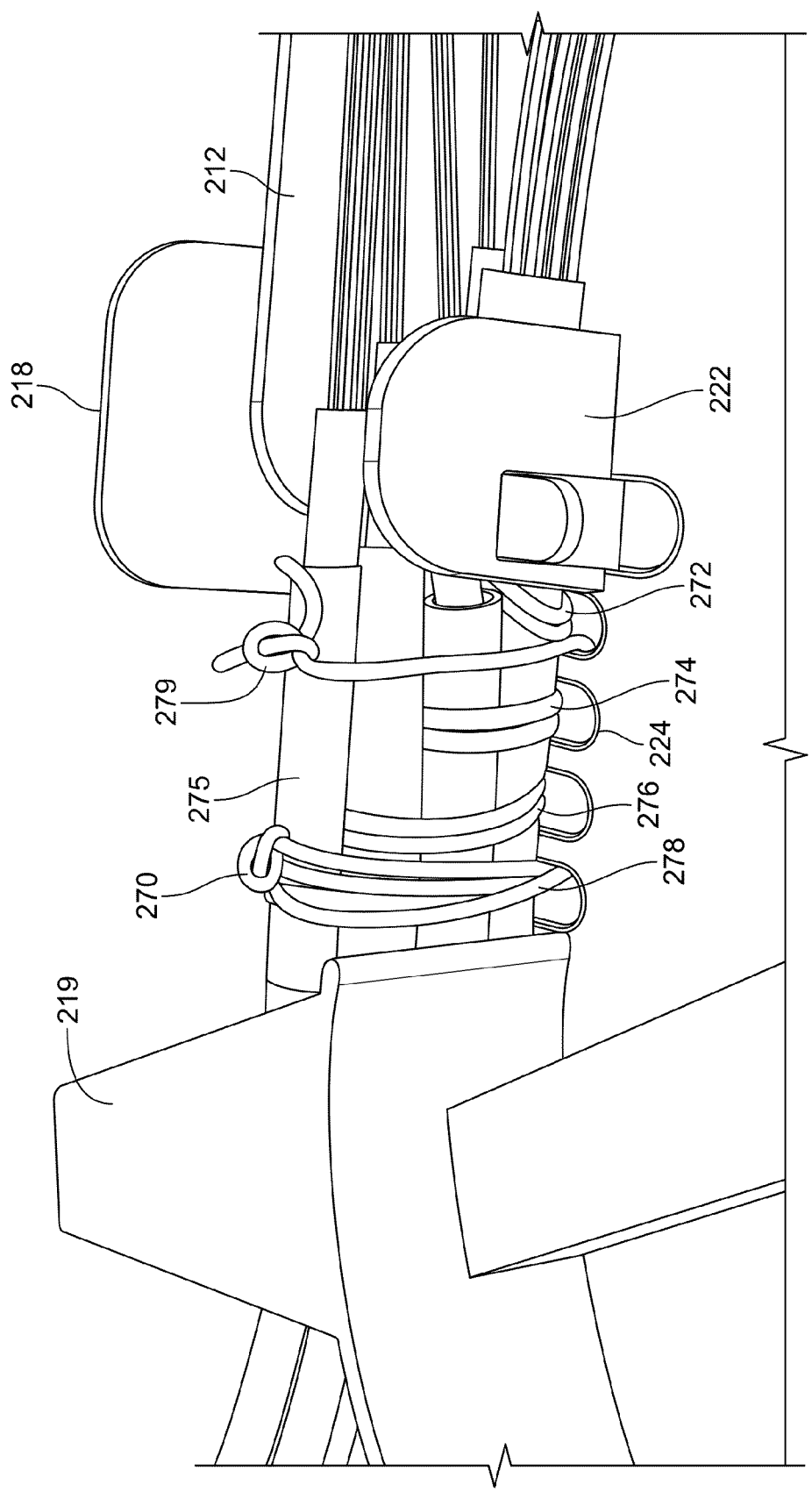
FIG. 18 is an enlarged view of the base of FIG. 3 with multiple optical cables fastened to a transition region using wax lacing in accordance with some aspects of the disclosure.

Referring to FIG. 18, the jacketed or buffered portions of the input and output cables may be secured to the base 210 of the cassette 200. For example, in some implementations, the jacketed or buffered portions of the input and output cables may be fastened to the base 210 using cable ties. In other implementations, however, the jacketed or buffered portions of the input and output cables may be fastened to the base 210 using wax lacing 270, string, or other such ties. As shown in FIG. 18, the wax lacing 270 may be threaded through the openings 224 at the transition region 220 of the base 210.

In some implementations, the jacketed or buffered portions of the input and output cables may be secured to the base 210 in a stacked configuration. The spool wall 212 and transition guide 222 hold the cables therebetween to aid in retaining the cables in the stacked configuration (see FIG. 20). In certain implementations, felt tape 275 may be wrapped around each jacketed or buffered portions of the input and output cables to enhance resistance between the wax lacing 275 and the cables and to aid in retaining the cables in the stacked configuration. In certain implementations, the felt tape 275 extends along a distance of the jacketed or buffered cable portion sufficient to extend across the openings 224.

In the example shown in FIG. 18, one input cable and six output cables are arranged in a stacked configuration having three rows of two cables and a top row of one cable. In certain implementations, the input cable is one of the bottom-most cables. A first looped section 272 of the wax lacing 270 is threaded around the first row of cables and through a first pair of openings 224 in the base 210. A second looped section 274 of the wax lacing 270 is threaded around the first and second row of cables and through a second pair of openings 224 in the base 210. A third looped section 276 of the wax lacing 270 is threaded around the three rows of cables and through a third pair of openings 224 in the base 210. A fourth looped section 278 of the wax lacing 270 is threaded around all of the cables and through a fourth pair of openings 224 in the base 210. Finally, the ends of the wax lacing 270 are tied in a knot (e.g., square knot) 279 above the first looped section 272. In certain implementations, each of the looped sections forms a half-hitch with another of the looped sections. In other implementations, however, the wax lacing 270 may be otherwise tied around the cables.

The spliced optical fibers are routed around the inner guides 241 of the cover 230 so that optical fibers extending from both sides of the splice chip 250, 350 end up facing in a common direction. In the example shown in FIG. 19, a first optical fiber 301 is spliced to a second optical fiber 302 and the splice is protected by a splice 265 and disposed at the splice chip 250, 350. The first optical fiber 301 extends from the splice 265, wraps around the first spool 242 of the inner guides 241, and extends over the channel ramp 244 at which the first optical fiber 301 transitions to the cover 230. The second optical fiber 302 extends from an opposite end of the splice 265, wraps around the second spool 243 of the inner guides 241, crosses between the spools 242, 243, wraps around the first spool 242, and thereafter follows the same path as the first optical fiber 301. Additional spliced optical fibers are routed in the same pattern. In other implementations, the fibers may be otherwise routed between the two spools 242, 243 until the fibers extend together in a common direction.

Figure 19:
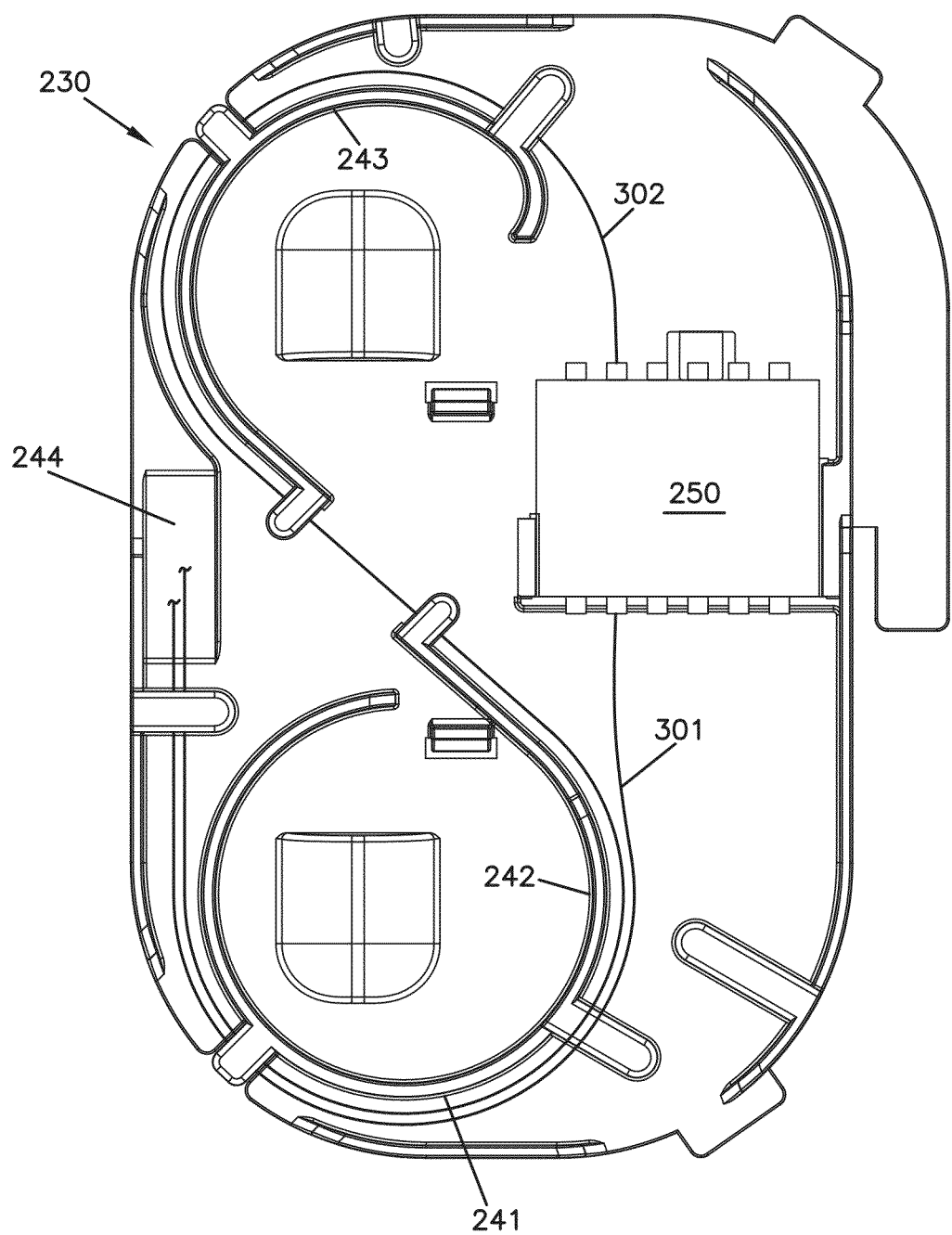
FIG. 19 shows one example fiber routing configuration that may be used with the cover of FIG. 7.
Figure 20:
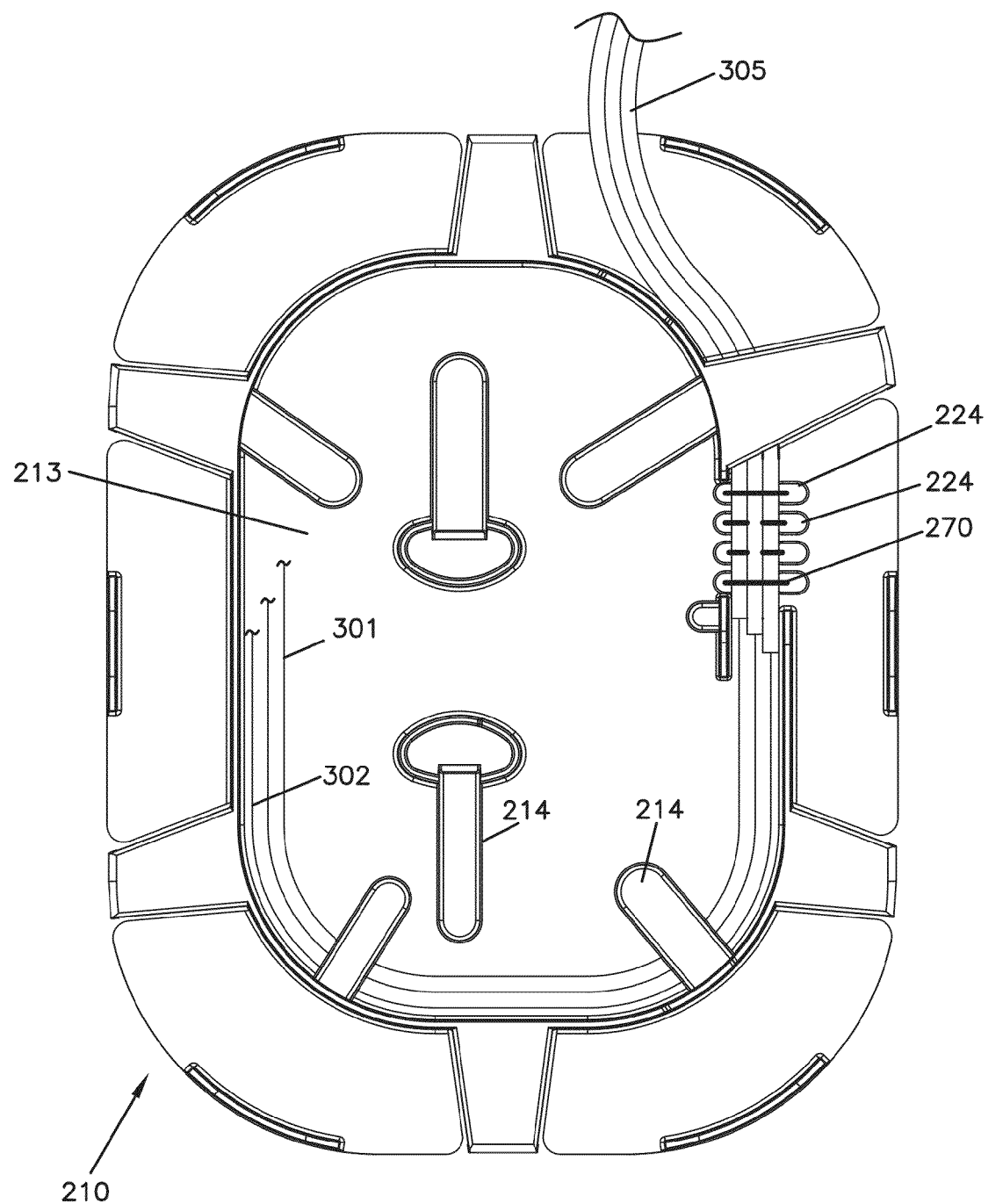
FIG. 20 shows one example fiber routing configuration that may be used with the base of FIG. 3.

Referring to FIGS. 19 and 20, the cover 230, which holds the splice chip 250, 350, the splices, and the first windings of optical fibers as described above, is mounted to the base 210. Any excess length of the optical fibers between the tied down sections of the jacketed or buffered cables and the sections wrapped around the inner guides 241 of the cover 230 may be stored within the inner region 213 of the base 210 as shown in FIG. 20. The optical fibers may be routed beneath and around the inner retention fingers 214 in one or more loops. A length of optical fiber is stored to accommodate resplicing of the optical fibers if necessary and to accommodate movement of the cover 230 to a remote position from the base 210 to facilitate the splicing process.

The cover 230 is oriented so that the inwardly-facing surface 231 faces the stored optical fibers. The transition region 236 of the cover 230 aligns with the transition region 220 of the base 210 so that the cover 230 encloses any unjacketed or unbuffered optical fibers (see FIG. 21). The cover 230 is pushed towards the base 210 so that the latch fingers 235 of the cover 230 extend into and attach (e.g., snap-fit, latch, etc.) to the latch receivers 215 of the base 210. The support flanges 233 seat on the spool wall 212 of the base 210. In certain implementations, a half-twist is added to the optical fibers when the fibers are initially routed around the cover 230. For example, a half-twist may be added to a fiber ribbon so that the same optical fiber is consistently positioned at a top of the ribbon. In such implementations, the fibers are untwisted when the cover 230 is mounted to the base 210.

Figure 21:
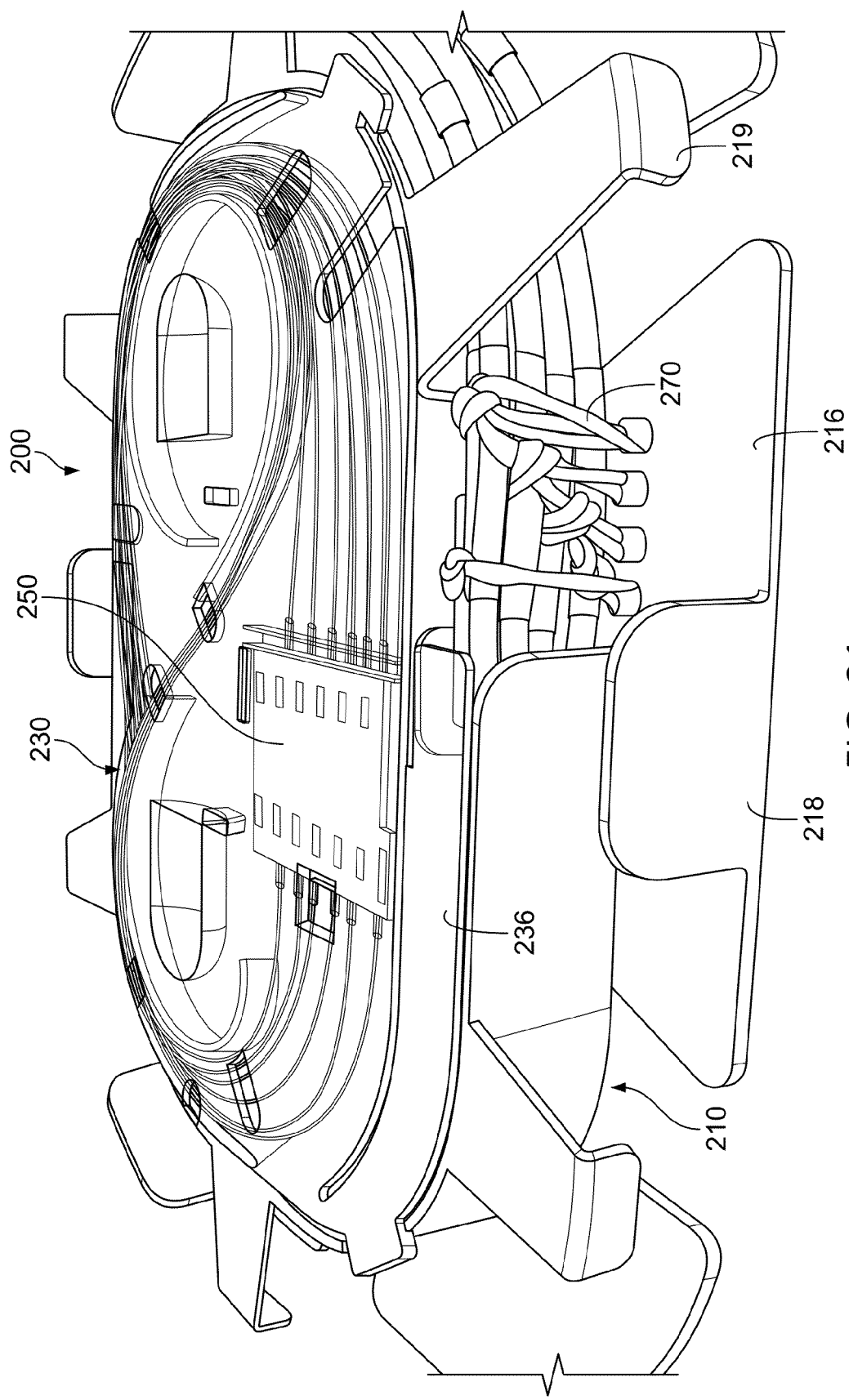
FIG. 21 shows one example cabled splice cassette configured in accordance with the principles of the present disclosure.

As shown in FIG. 21, the jacketed or buffered portions of the cables are routed around the outer channel 216 of the base 210. The cables are threaded through the outer retention fingers 219 in one or more loops around the outer channel 216. In certain implementations, the cables are routed around the outer channel 216 after the cover 230 is mounted to the base 210.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A splice chip comprising:
 a base having a first side, an opposite second side, and guide edges along part of a perimeter of the base;
 a plurality of separation members extending upwardly from the base to define a plurality of rows, each row including two separation members;
 a plurality of latching fingers extending upwardly from the base to further define the rows, at least one of the rows including at least a first latching finger, a second latching finger, and a third latching finger, the third latching finger being shorter than the first and second latching fingers, and the second latching finger being shorter than the first latching finger, the first, second, and third latching fingers of the at least one row being disposed between the respective two separation members.

2. The splice chip of claim 1, wherein the at least one row also includes a fourth latching finger that is the same height as the first latching finger.

3. The splice chip of claim 2, wherein the second latching finger is disposed between the first latching finger and one of the separation members of said row; and wherein the third latching finger is disposed between the fourth latching finger and one of the separation members of said row.

4. The splice chip of any of claim 1, wherein each row has the same arrangement of latching fingers.

5. The splice chip of any of claim 1, further comprising a support wall disposed at one end of the base.

6. The splice chip of claim 5, wherein the latching fingers all face towards the support wall.

7. The splice chip of any of claim 1, wherein the third latching finger is sized to retain a first splice to the base.

8. The splice chip of claim 7, wherein the second latching finger is sized to retain a second splice stacked on the first splice.

9. The splice chip of claim 8, wherein the first and fourth latching fingers are sized to retain a third splice stacked on the second splice.

10. The splice chip of any of claim 1, wherein the guide edges define opposite ends of the base.

11. A method of organizing fusion splices between a plurality of first optical fibers and a plurality of second optical fibers, the method comprising:
 seating a first splice in a first row of a splice chip and latching the first splice to the splice chip with at least a first latching finger, the first row extending across a width of the splice chip, the width being about 1.2 inches to about 1.8 inches, wherein the first splice protects a fusion splice between one of the first optical fibers and one of the second optical fibers;
 seating a second splice in the first row of the splice chip and latching the second splice to the splice chip with at least a second latching finger, wherein the second splice protects a fusion splice between another of the first optical fibers and another of the second optical fibers, the second latching finger being laterally aligned with the first latching finger; and
 seating a third splice in the first row of the splice chip and latching the third splice to the splice chip with at least a third latching finger, wherein the third splice protects a fusion splice between yet another of the first optical fibers and yet another of the second optical fibers, the third latching finger being laterally aligned with the first and second latching fingers.

12. The method of claim 11, wherein latching the third splice to the splice chip comprises latching the third splice to the splice chip using the third latching finger and a fourth latching finger that is a common height with the third latching finger, the fourth latching finger being laterally aligned with the third latching finger.

13. The method of claim 11, wherein latching the first splice to the splice chip with at least the first latching finger comprises latching the first splice to the splice chip with only the first latching finger.

14. The method of claim 11, wherein seating each of the splices in the first row comprises sliding the splice between longitudinally spaced separation members.

15. The method of claim 11, further comprising seating a fourth splice in a second row of the splice chip and latching the fourth splice to the splice chip with at least a fifth latching finger, wherein the fifth splice protects a fusion splice between one of the first optical fibers and one of the second optical fibers.

16. The method of claim 15, wherein the fifth latching finger is aligned with the first latching finger of the first row and offset from the other latching fingers of the first row.

17. The method of claim 15, wherein the fourth splice is seated in the second row before the second splice is seated in the first row.

18. A splice chip comprising:
- a base defining a plurality of channels extending across a width of the base between first and second edges of the base, the base having a length extending between first and second ends of the base, the first and second ends extending between the first and second edges;
- a support wall extending upwardly from the base at the first end of the base;
- a plurality of first separation members extending upwardly from the base at the first edge of the base, each of the first separation members corresponding to a respective one of the channels, each first separation member defining a flat surface facing the first end of the base and a flat surface facing the second end of the base, each flat surface extending along a full height of the respective first separation member;
- a plurality of second separation members extending upwardly from the base at the second edge of the base, each of the second separation members being laterally aligned with one of the first separation members, each second separation member defining a flat surface facing the first end of the base and a flat surface facing the second end of the base, each flat surface extending along a full height of the respective second separation member; and
- a plurality of latching fingers extending upwardly from the base, each of the latching fingers corresponding with a respective one of the channels, each of the latching fingers including a hook extending outwardly over the respective channel towards the support wall, and each of the latching members being disposed between and laterally aligned with one of the first separation members and one of the second separation members.

19. The splice chip of claim 18, wherein the latching fingers each have one of a plurality of heights, and wherein each channel corresponds with no more than one latching finger of each height.

* * * * *